United States Patent
Lehmann et al.

(10) Patent No.: US 12,455,919 B2
(45) Date of Patent: Oct. 28, 2025

(54) SYSTEM AND METHOD FOR AUTOMATED INTEGRATION OF CONTEXTUAL INFORMATION WITH A SERIES OF DIGITAL IMAGES DISPLAYED IN A DISPLAY SPACE

(71) Applicant: Pangee, Inc., New York, NY (US)

(72) Inventors: Laura Lehmann, New York, NY (US); Sorat Tungkasiri, Skillman, NJ (US)

(73) Assignee: TectoniQ, Inc., New York, NY (US)

( * ) Notice: Subject to any disclaimer, the term of this patent is extended or adjusted under 35 U.S.C. 154(b) by 0 days.

(21) Appl. No.: 18/510,556

(22) Filed: Nov. 15, 2023

(65) Prior Publication Data
US 2024/0160656 A1    May 16, 2024

Related U.S. Application Data

(60) Provisional application No. 63/425,659, filed on Nov. 15, 2022.

(51) Int. Cl.
| | |
|---|---|
| G06F 7/00 | (2006.01) |
| G06F 3/04842 | (2022.01) |
| G06F 3/14 | (2006.01) |
| G06F 16/00 | (2019.01) |
| G06F 16/48 | (2019.01) |

(52) U.S. Cl.
CPC .......... *G06F 16/48* (2019.01); *G06F 3/04842* (2013.01); *G06F 3/14* (2013.01)

(58) Field of Classification Search
None
See application file for complete search history.

(56) References Cited

U.S. PATENT DOCUMENTS

| | | |
|---|---|---|
| 7,177,448 B1 | 2/2007 | Sah |
| 7,725,530 B2 | 5/2010 | Sah et al. |
| 7,730,109 B2 | 6/2010 | Rohrs et al. |

(Continued)

FOREIGN PATENT DOCUMENTS

| | | |
|---|---|---|
| AU | 2010201642 A1 | 5/2010 |
| KR | 1020190090599 A | 8/2019 |

(Continued)

OTHER PUBLICATIONS

Final Office Action for U.S. Appl. No. 17/666,788, mailed Jul. 9, 2024, 15 pages.

(Continued)

*Primary Examiner* — Tuan A Pham
(74) *Attorney, Agent, or Firm* — Elliott, Ostrander & Preston, P.C.

(57) ABSTRACT

A user interface application displays a series of digital images in a display space. A user interface receives input to select one of the series of digital images, or portion thereof. The user-selected digital image, or portion thereof, is displayed in a location with the field of view of the displayed series of digital images or display space. While the user interface application continues to display the series of digital images in the display space, an application, such as a chatbot, searches one or more digital data sources for, and retrieves, contextual information based on the displayed user-selected digital images or portion thereof, without receiving user input to perform the searching.

16 Claims, 22 Drawing Sheets

(56) References Cited

U.S. PATENT DOCUMENTS

| | | | |
|---|---|---|---|
| 8,739,123 | B2 | 5/2014 | Appleton et al. |
| 9,009,589 | B2 | 4/2015 | Gossweiler et al. |
| 9,294,334 | B2 | 3/2016 | Rosenstein et al. |
| 9,916,293 | B2 | 3/2018 | Sah et al. |
| 10,878,389 | B2 | 12/2020 | Shtylman et al. |
| 11,075,891 | B1 | 7/2021 | Long et al. |
| 11,080,687 | B2 | 8/2021 | Vladi |
| 11,120,473 | B2 | 9/2021 | Sah et al. |
| 2007/0136201 | A1 | 6/2007 | Sah et al. |
| 2007/0204010 | A1 | 8/2007 | Sah et al. |
| 2017/0116640 | A1 | 4/2017 | Sah et al. |
| 2017/0308590 | A1 | 10/2017 | Ramesan et al. |
| 2018/0131643 | A1 | 5/2018 | Trufinescu et al. |
| 2018/0316636 | A1 | 11/2018 | Kamat et al. |
| 2018/0365731 | A1 | 12/2018 | Sah et al. |
| 2019/0026821 | A1 | 1/2019 | Bathen et al. |
| 2020/0005284 | A1 | 1/2020 | Vijayan |
| 2021/0027294 | A1 | 1/2021 | Trevethan |
| 2021/0248214 | A1 | 8/2021 | Goldston et al. |
| 2021/0304196 | A1 | 9/2021 | Patterson |
| 2021/0398095 | A1 | 12/2021 | Mallett et al. |
| 2022/0058285 | A1 | 2/2022 | Trenholm et al. |
| 2022/0179665 | A1* | 6/2022 | Rathod .................... G06F 9/451 |
| 2022/0198410 | A1 | 6/2022 | Yang et al. |
| 2022/0309131 | A1 | 9/2022 | Nguyen |
| 2022/0337439 | A1* | 10/2022 | McCoy ................. H04L 9/3247 |
| 2022/0391633 | A1* | 12/2022 | Harikumar ............. G06V 10/82 |
| 2023/0018175 | A1 | 1/2023 | Kaplan et al. |
| 2023/0019687 | A1 | 1/2023 | Amano |
| 2023/0140933 | A1 | 5/2023 | Gittleson |
| 2023/0206216 | A1 | 6/2023 | Lehmann |
| 2023/0231713 | A1 | 7/2023 | Seo et al. |

FOREIGN PATENT DOCUMENTS

| | | |
|---|---|---|
| WO | 0102941 A2 | 1/2001 |
| WO | 2022140454 A1 | 6/2022 |
| WO | 2023122286 A1 | 6/2023 |
| WO | 2023239968 A1 | 12/2023 |

OTHER PUBLICATIONS

U.S. Appl. No. 18/208,683, filed Jun. 12, 2023, Laura Lehmann.

International Search Report and Written Opinion for International Patent Application No. PCT/US23/25070, mailed Sep. 21, 2023, 11 pages.

International Search Report and Written Opinion issued by the International Search Authority in connection with International Patent Application No. PCT/US22/53838, dated Mar. 27, 2023, 7 pages.

Non-Final Office Action for U.S. Appl. No. 17/666,788), mailed Oct. 27, 2023, 22 pages.

Rounak Banik, Medium, "Tutorial: Writing an NFT Collectible Smart Contract," Oct. 31, 2021, https://medium.com/scrappy-squirrels/tutorial-writing-an-nft-collectible-smart-contract-9c7e235e96da. (Year: 2021).

Non-Final Office Action for U.S. Appl. No. 17/666,788, mailed Apr. 7, 2025, 17 pages.

Extended European Search Report for European Patent Application No. 24221547.3, mailed 20250516, 8 pages.

* cited by examiner

SYSTEM AND METHOD FOR AUTOMATED INTEGRATION OF CONTEXTUAL INFORMATION WITH A SERIES OF DIGITAL IMAGES DISPLAYED IN A DISPLAY SPACE

CROSS REFERENCE TO RELATED DOCUMENTS

This application claims the benefit of U.S. Provisional Patent Application No. 63/425,659, filed Nov. 15, 2022, entitled "METHOD AND APPARATUS FOR COLLECTING AND TRANSFERRING ELECTRONIC IMAGES VIEWED IN A BROWSER TO A TRAY, CHATBOT OR SHOPPING CART", the disclosure of which is incorporated by reference herein in its entirety. This application is related to U.S. patent application Ser. No. 17/666,788, filed Feb. 8, 2022, entitled "BLOCKCHAIN BRIDGE SYSTEMS, METHODS, AND STORAGE MEDIA FOR TRADING NON-FUNGIBLE TOKEN", the disclosure of which is incorporated by reference herein in its entirety. This application is related to U.S. Patent Application No. 63/293,407, filed Dec. 23, 2021, entitled "BLOCKCHAIN BRIDGE SYSTEMS, METHODS, AND STORAGE MEDIA FOR TRADING NON-FUNGIBLE TOKEN" the disclosure of which is incorporated by reference herein in its entirety. This application is related to U.S. patent application Ser. No. 18/208,683, filed Jun. 12, 2023, entitled "SYSTEM AND METHOD FOR AUTOMATED INTEGRATION OF CONTEXTUAL INFORMATION WITH CONTENT DISPLAYED IN A DISPLAY SPACE", the disclosure of which is incorporated by reference herein in its entirety.

TECHNICAL FIELD

Embodiments of the invention relate to digital display systems, and in particular, searching for and adding contextual information to, or within, a view of a series of digital images displayed in the digital display system in response to user interaction and without receiving user input to perform the searching.

BACKGROUND

Users typically open many tabs or windows in their web browser application, with spillovers from searches and external hyperlinks. This model lacks a simple interactive interface that enables automatically searching for and retrieving, obtaining or extracting contextual information, for example, from hyperlinks and searches, without leaving a webpage, and without requiring user input to perform such functions. Moreover, it is the user's interaction with a webpage—scrolling, stopping, watching—which should dictate what, and the speed at which, contextual, or relevant, information surfaces, that is, what, and the speed at which, relevant information is displayed in the digital display system. Ideally, relevant information extraction (search and retrieval) ought to happen in real time, ahead of or in reaction to a user's behavior or interactions, at the point, or at least in the general location, of the user's eye-gaze or scrolling. The user shouldn't have to initiate the search for contextual information, for example, by clicking on a hyperlink, or opening a new tab or window in a browser to conduct a search for further information—it should happen automatically based on the user's interaction with the webpage, without the user providing any instruction or command to do so. What is needed is an interface to capture, triage (filter), and display incoming real-time information related to content of a displayed page that potentially could have hundreds of links, and thousands if not millions of pieces of relevant contextual information.

The human brain processes images many thousands of times faster than text, and most information transmitted to the brain is in visual form. Most human reflexes are governed by what humans see, especially online. Most people often want to save the content of an image, because it reminds them of something that is contextually important to them, such as an article or a piece of clothing. It is often easier to save an image and remember why it was saved, than visualizing text or a product.

There are many prior-art tools online that help with "saving" or "collecting" images. One is the ubiquitous "bookmark" button implemented in iOS and other software. Another tool is Pinterest, a website and app that allows a user to save and collect a series of images that are often serialized by topics, colors, products, etc. Pinterest & Shoppable, an online universal checkout tool available from 72Lux, Inc., also allow a user to purchase the products in many images they collect via a product catalog and shopping cart. Sometimes those same products and brands are then retargeted as advertising.

One problem with these tools is that they send the user from a website to an app or a different web page to "collect" those images. The origin or historical analog of collecting images goes back to when a reader used to tear out pages from a magazine and place those tear-outs next to him/her or in a file folder in a desk drawer. The reader did not have to walk to another room to collect a tear-out. Doing so would have interrupted the flow of collecting images.

One should be able to collect a webpage, or any media online, and have it be visible as the user keeps browsing the web, perhaps inspired by that visual. Not only is having the media in the same browsing window important to reduce the amount of friction in the user journey, but doing so allows embodiments of the invention to filter surrounding contextual information to that media and save it within that media.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 20:
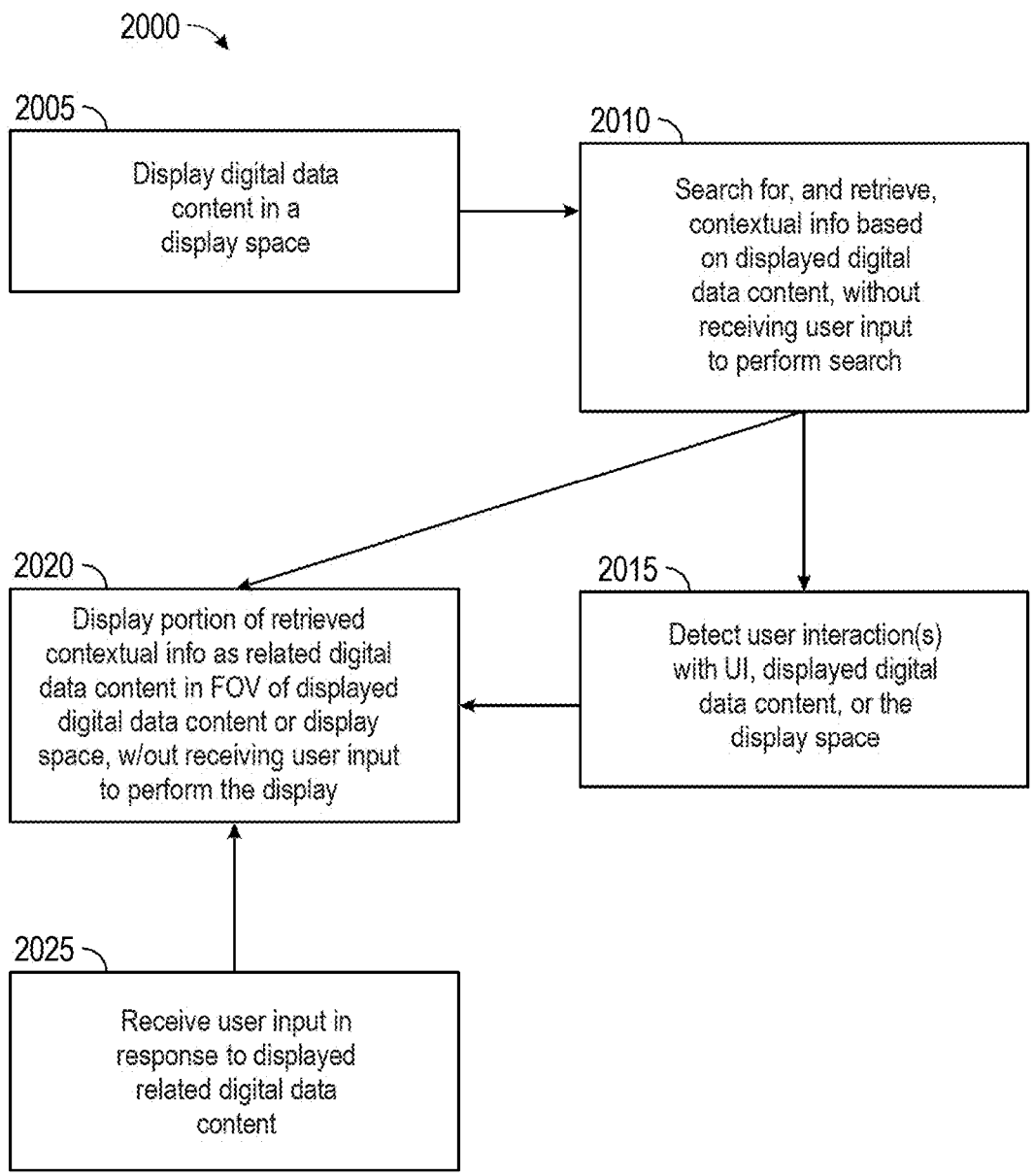
FIG. 20 is a flowchart of an embodiment of the invention.

With reference to the flowchart 2000 in FIG. 20, according to embodiments, a computing system comprises a display space, one or more processors, and a memory to store computer-executable instructions. The computer-executable instructions include program code for a user interface application and a messaging platform application, such as a chatbot application. Those applications, when executed by the one or more processors, cause the one or more processors to perform the following operations, including displaying, by the user interface application, digital data content in the display space at block 2005 and, while the user interface application continues to display the digital data content in the display space, at block 2010 searching in one or more digital data sources for, and retrieving, by the chatbot application, contextual information based on the displayed digital data content. This functionality is performed automatically, without receiving user input to perform the searching and/or retrieving operations or to cause the contextual information to be displayed.

The chatbot applications, while the user interface application continues to display the digital data content in the display space, detects one or more user interactions with one or more of the user interface applications, the displayed digital data content, or the display space at block 2015. The chatbot application then displays a portion of the retrieved contextual information as related digital data content in a location within a field of view of the displayed digital data content or the display space, based in part on the detected one or more user interactions with the one or more of the user interface applications, the displayed digital data content, or the display space, without receiving user input to perform the displaying, at block 2020.

At block 2025, while the user interface application continues to display the digital data content in the display space, the chatbot application may receive user input, responsive to the displayed portion of the retrieved contextual information as related digital data content.

Figure 21:
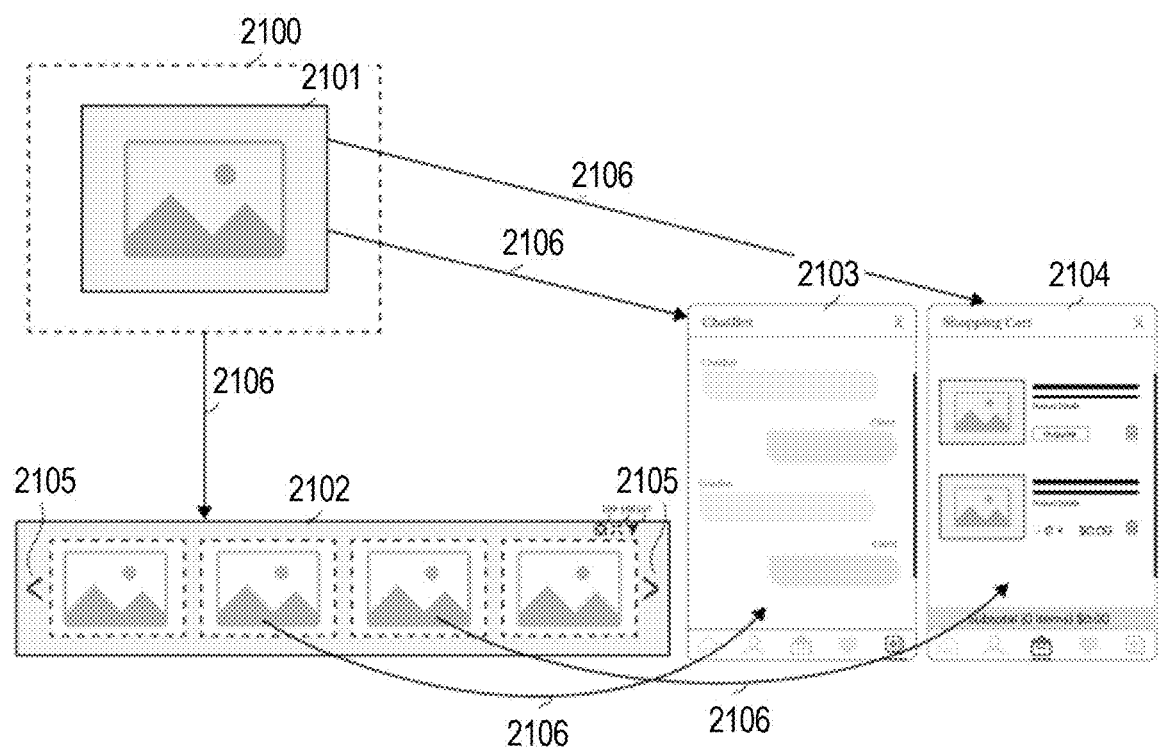
FIG. 21 illustrates a user interface according to another embodiment of the invention.
Figure 22:
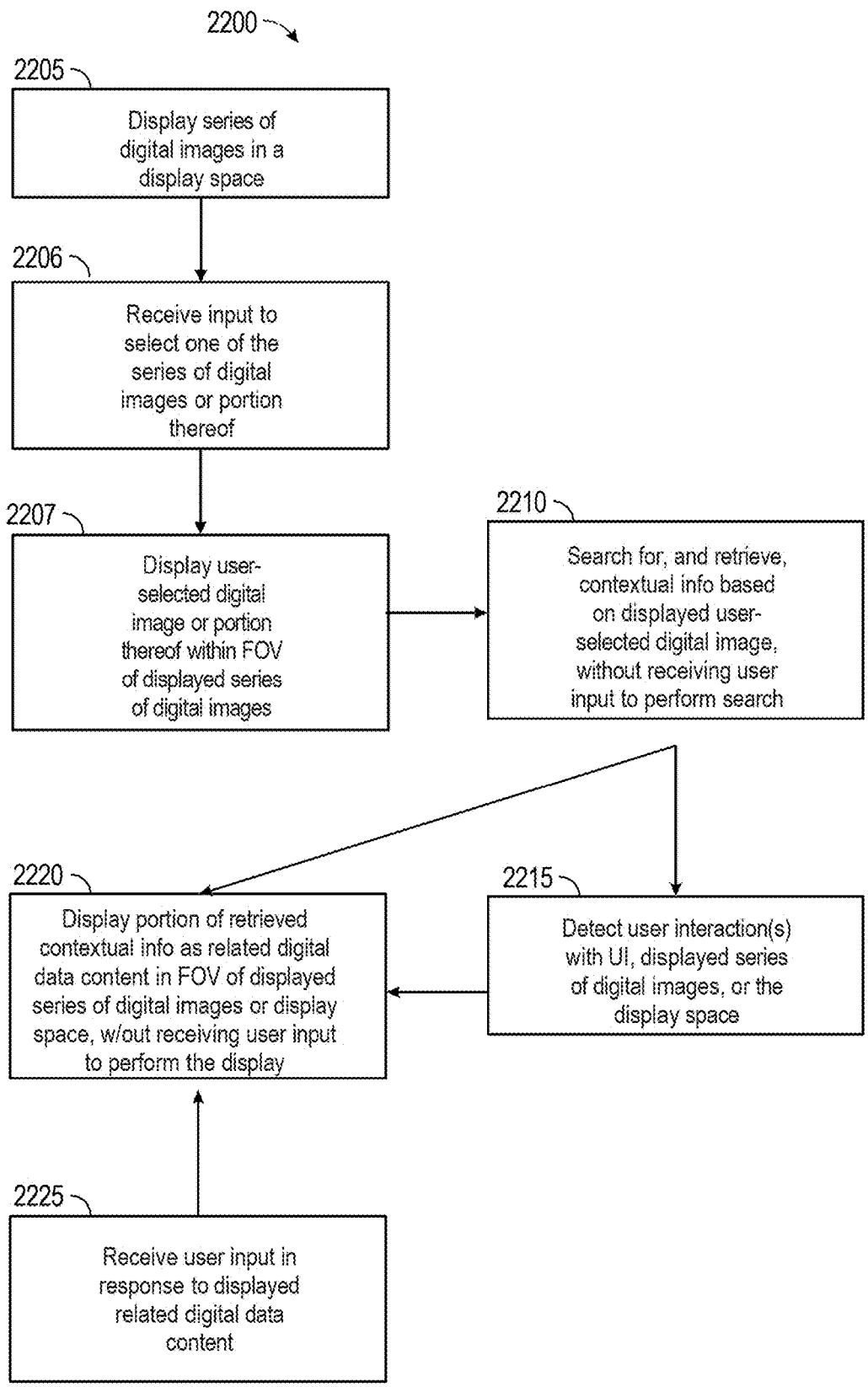
FIG. 22 is a flowchart of another embodiment of the invention.

With reference to the user interface 2100 illustrated in FIG. 21 and the flowchart 2200 in FIG. 22, according to embodiments, a computing system comprises a display space, one or more processors, and a memory to store computer-executable instructions. The computer-executable instructions include program code for a user interface application 2100 and a messaging platform application 2103, such as a chatbot application. Those applications, when executed by the one or more processors, cause the one or more processors to perform the following operations, including displaying, by the user interface application 2100, a series of digital images 2101 in the display space at block 2205, followed by receiving at block 2206, via the user interface application 2100 user input 2106 to individually select any one or more of the series of digital images, or a portion thereof appearing in the selected one of the series of digital images, and then displaying at block 2207 the user-selected digital image, or portion thereof, in a location such as a media gallery window 2102, chatbot window 2103, or shopping cart window 2104 within a field of view (FOV) of the displayed series of digital images or the display space. A series of digital images is defined herein to mean that a user could keep browsing through a series of images after, or while, a user-selected one of the series of digital images has been transferred, e.g., dragged and dropped, to a chatbot window or a shopping cart.

The media gallery window 2102 in one embodiment is considered or treated as a personal media gallery for a user and to which the user may drag one or more digital images from a webpage. The gallery has infinite storage capacity. A user may browse their personal media gallery for, example, by pressing the back/reverse and front/forward arrow keys 2105. They may also maximize the gallery window to a full screen for visual convenience and inspection of the digital images housed therein along with meta data associated with each of the digital images. The chatbot window 2103 in one embodiment allows users to find contextual information about a digital image. The shopping cart window 2104 allows a user to purchase the digital image.

While the user interface application continues to display the user-selected digital image, or portion thereof, at block 2207, searching occurs at block 2210 in one or more digital data sources for, and retrieving, by the chatbot application, contextual information based on the displayed user-selected digital image, or portion thereof. This functionality is performed automatically, without receiving user input to perform the searching and/or retrieving operations or to cause the contextual information to be displayed.

The chatbot application, while the user interface application continues to display the user-selected digital image, or portion thereof, detects at block 2215 one or more user interactions with one or more of the user interface applications, the displayed series of digital images, or the display space. This user interaction could be accomplished with one or more of the web browser, a browser window, a browser window in which the digital image(s) is displayed, the display space (i.e., outside the browser app or windows), the media gallery, the chatbot pop up window, or the shopping cart pop up window. The chatbot application then displays at block 2220 a portion of the retrieved contextual information as related digital data content in a location within a field of view of the displayed series of digital images or the display space, based in part on the detected one or more user interactions with the one or more of the user interface applications, the displayed series of digital images, or the display space, without receiving user input to perform the displaying. Thus, the display of related digital data content is essentially filtered in response to the user interactions.

Finally, at block 2225, while the user interface application continues to display the series of digital images in the display space, the chatbot application may receive user input, responsive to the displayed portion of the retrieved contextual information as related digital data.

In one embodiment, the user interface application receives user input to transfer the displayed user-selected digital image or the portion thereof in the location within the field of view of the displayed series of digital images or the display space to an online shopping cart. The online shopping cart may then retrieve the related digital data content added to or associated with, the file, the repository, or the storage location in or at which the displayed user-selected digital image, or the portion thereof, is maintained. In one embodiment, the user interface application receives the user input to select one of the series of digital images, or the portion thereof, in the form of, for example, a voice command, a gesture command, a photo, a video, or a screenshot taken by the user.

With reference to the embodiment discussed above and illustrated in FIGS. 21 and 22, consider a user reading an article about a vacation destination in, for example, Phoenix, Arizona. There is a beautiful digital image of a desert. Not only would the user want to be able to save the digital image (because it is aesthetically pleasing) but the user may also want to save related information such as hotels, restaurants, and activities in the area. Through embodiments of the invention, the digital image is representative of all the contextually relevant information. Relevant information may then further be filtered into main categories and saved to a database, for example, on a blockchain in the cloud. Searching these databases may surface product information, content, articles, etc. which are all linked within the ecosystem of the collected digital image.

According to embodiments, any media (a digital image, video, or video frame, an entire webpage, a field of view (FOV), a photo or a screenshot) can be moved or transferred, e.g., dragged and dropped, into one or more of a series of browser apps. In an iOS environment with support for detachable objects, a user can drag and drop "objects" within a jpeg, video frame, etc., or a field of view, if a user is wearing VR, AR or MR glasses.

Furthermore "drag and drop" operations are not limited to that action: drag and drop could be initiated by a voice command as in "save media into the gallery" or by taking a photo, a video, a screenshot. If a cursor is not present, a drag and drop operation can be replaced with eye movements or hand movements such as blinking, pointing and swiping.

With regard to media gallery 2102, embodiments contemplate dragging and dropping media, e.g., digital images, from user interface application 2100 into the gallery. It is appreciated that media may carry its own embedded information. The media may also be surrounded by contextual information that a live scraper can identify according to embodiments of the invention. As the media is dragged and dropped, all of the contextual information is saved, for example, on a blockchain, identified with the media. As such, the media gallery is not only an interface for the user to collect media, but the media gallery may also be a converter of the media into a layered contextual media system.

In one embodiment, the media gallery may be implemented on a client site (either white-labeled or branded) or integrated on a standalone system with an ecommerce system, individualized content management system, or enterprise content management system. In one embodiment, the media gallery may be a tray that lives at the bottom of a client's webpage. It can have three states: 1) to be minimally visible at the bottom of the screen next to the cart or alone; 2) completely minimized; or 3) maximized for full view (full screen/floating window). As noted above, a user can drag an infinite amount of media into their media gallery. The gallery may be tied to a user's digital wallet on the blockchain for temporary storage. This storage may be maintained on a temporary database on a remote server for later viewing or purchasing. This information may be written later to the blockchain when purchased. The end-user may share their media gallery with anyone. A link may be shared which is a dynamic shortcode link that is auto-generated and linked to a portal website that displays the media gallery publicly. The shortcode link may also have a time limitation that the user can set in order to limit the view of the media gallery in the public portal. The user may also limit the media gallery as private at any time and stop sharing with anyone. With regard to a user's media gallery being tied to the user's digital wallet, in one embodiment, every media item in user's media gallery may be a non-fungible token (NFT). The information is written to the blockchain. It does not matter if the item is a physical item that is being sold or just exists as an NFT, that designation is denoted by the seller (client). For this reason, the user's media gallery is linked to the user's digital wallet as part of a private blockchain. When the user drags the media from the personal media gallery into the shopping cart and purchases the media, the information automatically gets written into the blockchain to show that the ownership is transferred from one ID to another. The blockchain may also record date of purchase, the public wallet IDs (both buyer and seller), amount, and from whom. The media gallery may also allow a user to sell any items in their collection. This feature allows the user to share their purchased media gallery collection and resell it for a desired amount.

As noted above, in one embodiment, the user interface application receives the user input to select one of the series of digital images, or the portion thereof, in the form of, for example, a photo, a video, or a screenshot taken by the user. It is appreciated that today, much of image collecting is done via a screenshot—in which a duplicate of a web page and/or image is captured. While that method is controversial and may not provide authenticity of the original content screenshot, it is recognized as a most common way of "saving" a digital image. Embodiments can detect if an image has been captured by a screenshot using a series of tools that enable the image to be "dropped" into the app. Therefore, the same method described herein for contextually layering media or a whole page can be used for a screenshot which is a "photo" of a webpage. The screenshot can be dragged and dropped into the user's media gallery.

As for photos, embodiments allow a user to synch his or her photo library with the media gallery. As discussed above this feature allows for access to another method for a user to collect/save information, either by screenshots or through photos. Photos may also be used in other instances, such as when using an iOS or android camera, or when using wearables, such as glasses or a watch. In such cases the images that are being "saved" are those which are contextually relevant to the user. The layered information being saved may be two-fold: location/GPS based information which may be tracked via a search engine, database etc.; and computer vision and/or any other type of machine learning which scans these images and layers product information. These images can then be collected, shopped and searched in the same way as described above.

It is appreciated that the interaction of contextual information can be gathered in real-time concurrently when or immediately after a photo is taken. As the photo is being captured, it can be analyzed in real-time and information sent to the user for the user to receive the contextual information in real-time and make informed decisions. The feedback, for example, can be an image taken on the street of a person wearing a particular shirt with a mobile device (e.g., a watch, smart phone, glasses, tablet, etc.). The image is instantly analyzed with the detection of geolocation, and the object in the image (clothing, jewelry, art, or any inanimate object) is analyzed and the user given options on where they can purchase that item locally, who manufactures it, or options to purchase online. This ability allows users to always "know" where they can purchase an item or what the object/item is about in real-time.

As for video frames, the user can drag and drop a video frame or an entire video into the platform. The contextual search engine automatically gathers the information for the user. For example, a user may be watching a television show or streaming video content and want to identify the product that a person is wearing or displaying and order the product or save the product later in their media gallery.

According to one embodiment, the user interface application displays digital data content authored by a first entity, such as an author or publisher, in the display space. The chatbot application according to this embodiment may search in one or more digital data sources for, and retrieve, contextual information authored by one or more entities other than the first entity, for example, a third-party retailer or other author or publisher, based on the displayed digital data content authored by the first entity. In such an embodiment, the chatbot application displays the portion of the retrieved contextual information authored by the one or more entities other than the first entity as related digital data content in the location within the field of view of the displayed digital data content authored by the first entity or the display space. Further in such embodiment, the chatbot application may receive user input, responsive to the displayed portion of the retrieved contextual information authored by one or more entities other than the first entity as related digital data content.

The following description considers many use cases for the above-described embodiments. In one case, the displayed digital data content identifies a first object purchasable from a first entity, and the displayed related digital data content identifies a second object purchasable from a second entity different than the first entity. In this case, the chatbot application displays the digital data content that identifies the first object and the related digital data content that identifies the second object in an online shopping cart.

According to another use case, the related digital data content is a digital image in which one or more objects appear. A digital image, for example, may be a frame from a video, an animated GIF, or a moving image, in addition to, for example, an image formatted in a .jpeg file. In this use case, the chatbot application displays the digital image in the location within the field of view of the displayed digital data content or the display space, and then receives user input, responsive to the displayed digital image, to search for information about the one or more objects that appear in the displayed digital image.

In yet another use case, the related digital data content is added to, or associated with, the related digital content in, a file, a repository, or a location in or at which the displayed digital data content is maintained. This may occur based in part on the detected one or more user interactions with the one or more of the user interface applications, the displayed digital data content, or the display space. This functionality may be performed automatically without receiving user input to perform the adding or associating. In this use case, the displayed digital data content may be a digital image comprising a plurality of pixels. The related digital data content may be added to, or associated with, one or more of the plurality of pixels in the file in which the digital image is maintained. It is also contemplated that a Non-Fungible Token (NFT) engine adds an NFT layer to the digital image, thereby creating an NFT file comprising the digital image, based on the related digital data content added to or associated with the one or more of the plurality of pixels in the file in which the digital image is maintained.

In another use case, adding the related digital data content to, or associating the related digital content with, a file, a repository, or a location in or at which the displayed digital data content is maintained, involves adding the related digital data content to, or associating the related digital content with, a location in a distributed digital ledger at which the displayed digital data content is maintained, or to a location chained to the location in the distributed digital ledger at which the displayed digital data content is maintained.

In this use case, the related digital data content may be a digital image in which one or more objects appear, in which case adding the related digital data content to, or associating the related digital content with, the location in the distributed digital ledger at which the displayed digital data content is maintained, or to the location chained to the location in the distributed digital ledger at which the displayed digital data content is maintained, involves adding the digital image to, or associating the digital image with, the location in the distributed digital ledger at which the displayed digital data content is maintained, or to the location chained to the location in the distributed digital ledger at which the displayed digital data content is maintained. In this case, the chatbot application may receive user input, responsive to the displayed digital image, to search for information about the one or more objects that appear in the displayed digital image, and search the location in the distributed digital ledger at which the displayed digital data content is maintained, or to the location chained to the location in the distributed digital ledger at which the displayed digital data content is maintained, for information about the one or more objects added to or associated with the displayed digital content.

Alternatively, in this use case, the related digital data content may be a digital image in which one or more objects appear, in which case, adding the related digital data content to, or associating the related digital content with, the location in the distributed digital ledger at which the displayed digital data content is maintained, or to the location chained to the location in the distributed digital ledger at which the displayed digital data content is maintained, involves adding the digital image to, or associating the digital image with, the location in the distributed digital ledger at which the displayed digital data content is maintained, or to the location chained to the location in the distributed digital ledger at which the displayed digital data content is maintained. A machine learning application may access the information about the one or more objects that appear in the displayed digital image added to or associated with the location in the distributed digital ledger at which the displayed digital data content is maintained, or to the location chained to the location in the distributed digital ledger at which the displayed digital data content is maintained, and train on the information about the one or more objects.

DETAILED DESCRIPTION OF SPECIFIC EMBODIMENTS

Embodiments of the invention operate on digital data content, or simply, content, displayed in a display space. For example, the content (e.g., a webpage, a video, a light field display projected in augmented reality (AR) glasses, a .jpeg image, a document, a spreadsheet, emails, etc.,) may be displayed in a particular space (e.g., a display screen, a display window, a browser window, or a light field display space). Relevant or contextual information is searched for and retrieved, obtained or extracted, from one or more digital data sources (e.g., hyperlinks, metadata, microdata, search results, advertising, etc.,) based on the displayed content. The contextual information is then displayed automatically as related digital data content in a location viewable in the display space. All of this happens without receiving user input to perform such functions.

According to an embodiment, the extracted contextual information is filtered, for example, based on a user's interactions with a user interface, the displayed digital data content, or the display space, so a portion of the extracted contextual information is displayed as related digital data content in the display space. The related content may be displayed in an e-commerce shopping cart or an online checkout system or may overlay or be embedded within the displayed content. According to embodiments, the displayed contextual information is filtered or selected at least in part based on a user's interactions with the displayed content (e.g., scrolling to, stopping at, resizing or moving, or paging through, the content in the display space), or by tracking movement of the user, for example, tracking the user's eye movement or the user's gaze point within the display space.

According to one embodiment, the displayed content identifies a first object or item purchasable from a first entity, and the related content identifies a second object or item purchasable from a second entity The two objects or items may then be combined into a unified online checkout system or shopping cart, as further described below in one example use case.

The contextual information is searched for and retrieved, i.e., extracted, from a network of data storage devices (e.g., the internet or World Wide Web) that stores the contextual information and to which the user's local computing device is connected in communication. A local- or web-based software widget can extract the contextual information during the displaying of the digital data content in the display space. A software widget is a relatively simple and easy-to-use software application or component made for one or more different software platforms. A desk accessory or applet is an example of a simple, stand-alone user interface, in contrast with a more complex application such as a spreadsheet or word processor. These widgets are typical examples of transient and auxiliary applications that don't monopolize or draw the user's attention.

According to embodiments, the portion of the extracted contextual information that is added to, or associated with, the displayed digital data content as the displayed content is being displayed can also be saved to a file or a repository or a location in or at which the displayed content is maintained, based in part on the user's interaction with the user interface, the displayed content, or the display space. For example, the extracted contextual information added or associated as related content to the location at which the displayed content is maintained may be automatically added or associated as related content to the location in a distributed digital ledger (i.e., a blockchain) at which the displayed content is maintained, or to a location chained to the location in the distributed digital ledger at which the displayed content is maintained. One object of embodiments of the invention is to be able to later search for the contextual information stored in the blockchain.

According to some embodiments, the displayed content is an image comprising a plurality of pixels. According to the embodiments, automatically adding or associating the portion of the extracted contextual information as related content to or with the displayed content to the file or the repository or the location in or at which the displayed content is maintained, involves adding the portion of the extracted information as related content in one or more pixels of the image. According to the embodiments, the pixels of the image in which the portion of the extracted information is added as related content may be used by a non-fungible token minting engine to add an NFT layer to the image, thereby creating an NFT file comprising the image, as further described below.

Embodiments of the invention contemplate the use of a chatbot or the like. A chatbot, or chatterbot, is a software application used to conduct an on-line chat conversation via text, text-to-speech, or voice interactions, in lieu of providing direct contact with a live human agent. A chatbot is a type of software application that can help users (customers) by automating conversations and interacting with them through a messaging platform. For example, a user may be scrolling through a webpage, a media file, or interacting in a mixed reality setting via augmented reality/virtual reality (AR/VR) glasses. According to the embodiments, a user does not have to leave his/her focus on a particular webpage to open another tab or window to search for relevant information or buy a product from a retailer through a hyperlink. Instead, contextually relevant information surfaces (i.e., is displayed) automatically, in response to a webpage's content or in response to the mixed reality setting. The chatbot software surfaces (i.e., displays) connected (i.e., related, relevant, contextual) information while the user discovers the page's content: e.g., a product is mentioned in an article, e.g., through a link, and is generated by the chatbot simultaneously in a cart. Alternatively, links can be automatically generated in response to references to related information within the webpage's contents. For example, references to documents, journal articles, patents, books, etc., can be quickly linked and referenced with other related content within a chatbot window overlaid on the webpage or display device. For example, a definition for a medical term being referenced in a webpage can automatically be provided in a pop-up window or the cart with other items, such as articles and texts related to the webpage and/or the medical term. These items, whether fashion products or academic journals—when monetizable—can be checked out within a multi-retail unified checkout system, as further described below.

According to the embodiment described above with reference to FIGS. 21 and 22, the intent to "know more" is prevalent for the chosen media or digital image: who is the owner or creator of the "media," why is it relevant, where is it located, etc. The drag and drop of a digital image from the user interface application 2100 into a "search" or "chatbot like" window 2103 refers to the chatbot's contextual search method which uses the scraper to initially traverse the DOM tree and crawl hyperlinks on the given page. The filtered information is generated in the chatbot, based on various contextual categories, and further filtered as the user engages with the chatbot and the AI language processing. Computer vision may be used to further define the selected media. Finally, the media may have assigned saved information within a database (such as its content creator) that is weighed into the chatbot query answer.

The chatbot may research within the user's media gallery 2102. The user may type in a command and prompt to search through the media gallery, for example, by name, date, or description. The user may also describe the media, to which the chatbot responds with matches closely related to the media as described.

Figure 1:
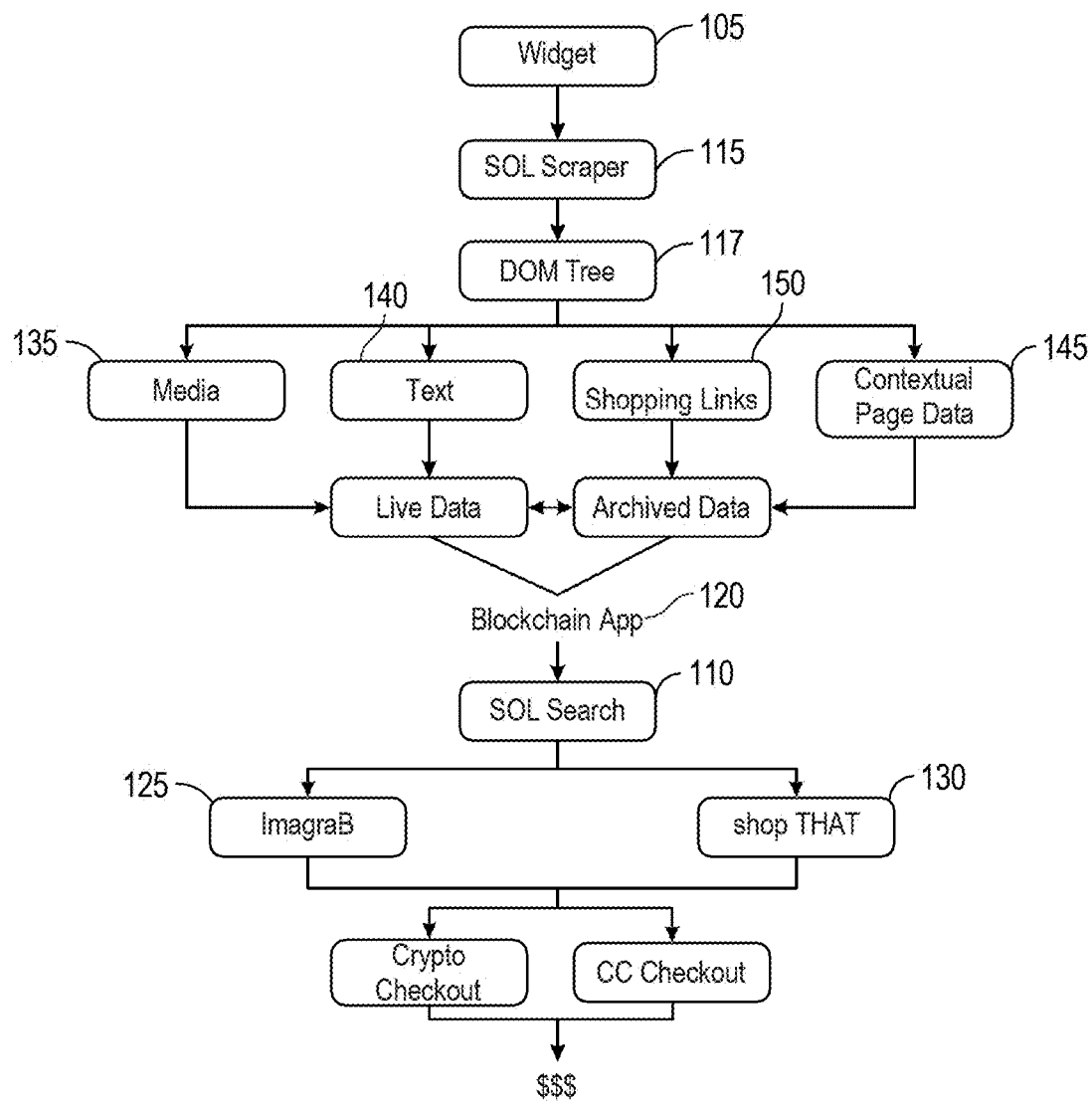
FIG. 1 illustrates an embodiment of the invention.
Figure 2:
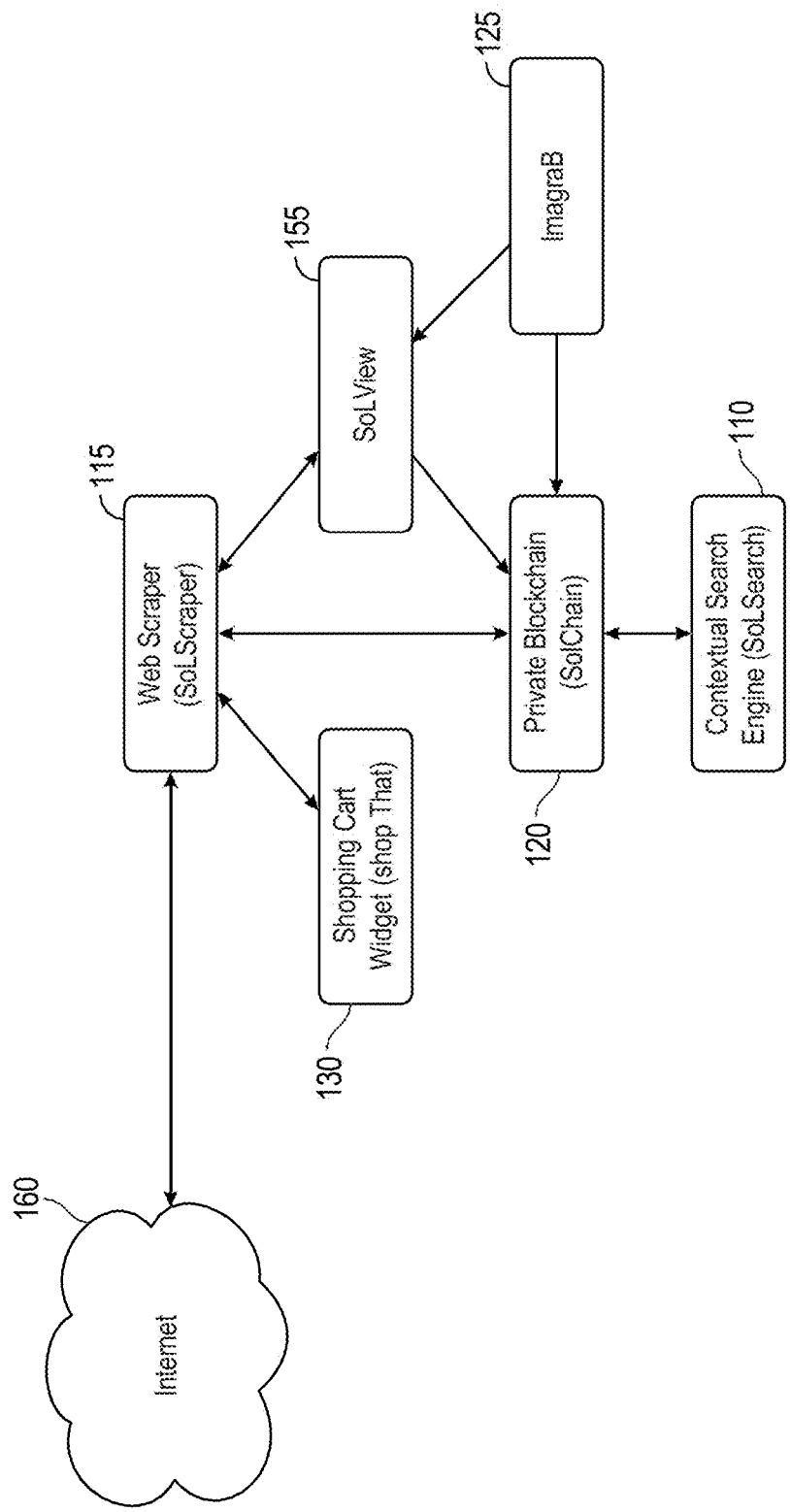
FIG. 2 illustrates an embodiment of the invention.

In this example, with reference to FIGS. 1 and 2, a chatbot, or a widget 105 associated with the chatbot, may be deployed during the loading of an author's or a publisher's webpage, and instantaneously scan the page for relevant contextual information, from keywords to metadata to links. Unlike a search engine, such as Google, which indexes uniform resource locators (URLs) prior to retrieving search results, a contextual search engine 110 (termed "search engine", or simply, "SoLSearch", as in, "Speed of Light Search", herein) associated with the chatbot can work without any prior indexing of URLs (although archived URLs may be used if relevant). The contextual search engine SoLSearch 110 is frictionless, based on real-time interactions of the user and leverages the contextual ecosystem or environment of the web page as a jumping-off point for scraping and crawling, via a web scraper 115, the internet or world wide web 160 for related content.

The search engine SoLSearch 110 differs from prior art contextual, metadata, or general search engines. The prior art search engines are always activated by a user's query, i.e., in response to user input to perform a search. Other contextual search engines use spiders ahead of time to crawl through the contents of websites and may be able to parse a webpage's text, crawl a webpage's links, and retrieve and scrape additional links from a separate database. The search engine SoLSearch 110 according to embodiments of the invention is the antithesis of prior art general search engines in use today. The search engine SoLSearch 110 anticipates (and may even render as moot) a user's query for contextual information based on the content in which the user is currently immersed before any query has been made. The webpage's contextual data, once extracted, can be further tailored to the user's interactions, e.g., the user's scrolling behavior or eye-gaze patterns, on that page. All the contextual data may be extracted, parsed, structured and displayed before the user has even engaged in a search query or automatically, without the user ever engaging a search query or taking or needing to take any affirmative steps to initiate the contextual search process.

As the contextual search query (as opposed to a user's query) begins, data can be filtered, i.e., further narrowed down, for example, based on a user's query. The user's query, however, is not necessary to fill either a shopping cart 130 or to inform the contextual search input. Rather, a "smartcart" automatically extracts any related information, e.g., product information, on the page, and the chatbot anticipates topics of inquiry, from shopping to geo-locative interests, without any input from the user.

In this manner, the search engine SoLSearch 110 can be thought of as a "reverse" search engine on three fronts: 1) it apprehends, or perceives, or predicts a user's query based on contextual information obtained from the page rather than the user's browsing history, 2) the search engine does not need a user query at all since the digital data content is enough to generate areas of search, and 3) the search engine's input, a webpage or the digital data content displayed on the webpage, for instance, would be considered the "output" of traditional search engines. The search engine's output on the other hand, could be simplified into a sentence, an image or a product, similar to what is input in a typical search engine's search bar.

Although the search engine SoLSearch 110 may be more restricted in its reach than a prior art search engine which may rely on historic indexing, the definition of "context" according to embodiments of the invention is infinite: a webpage, a spatial setting (as seen through a car window, a heads-up display, or AR/VR eyeglasses), digital media 135 (bitmap objects such as videos, images, audio files), or text 140 (textual objects such as word processing documents, spreadsheets, emails, etc.). Context, rather than being defined by its medium, is defined herein by the user's real time engagement via a user interface, a web interface, field of view, eye movement, hand movement, voice and/or hearing, or an overlay of one or more of each. It is the nature of the user's real time interaction or engagement that defines the hierarchy of the search query results, rather than the other way around.

One benefit of the search engine SoLSearch 110 is that it is not reliant on the user's data to return precise contextual answers. A user may choose to share their browsing data in the cart, for example, based on shopping incentives such as cryptocurrency credits. However, the search engine SoLSearch's results are not dependent on the user's prior searches, nor their browsing history, nor any other digital information gathered about the user. In fact, when used on an author's or publisher's website, the search engine SoLSearch 110 may not have any data about a user visiting the author's or publisher's website for the first time, or successive times where the user may be a guest and not log in or provide account information. Most of the search output is "personalized" in the sense that it is based on the contextual information associated with the webpage and in response to the user's behavior on or interactions with that page. For example, if the user browses through a display of a pair of women's sandals for a few seconds in the shopping cart 130, the search engine SoLSearch 110 may infer that the women's sandals may be contextually relevant with keywords such as "dresses" and the title of an article "what to wear this summer." This contextual data yields highly personalized search results, without compromising a user's data privacy.

Moreover, unlike prior art search engines, the search engine SoLSearch 110 does not algorithmically weigh the order of its search results against advertising hits, such as with search keywords and Adwords. These algorithms have over time contaminated the page ranking and preciseness of search results.

The starting point of the contextual search, according to embodiments of the invention, is a visual medium or user interface, e.g., a video, a field of view in AR glasses, or a simple jpeg image. It is that visual context which initiates the search engine SoLSearch's searching efforts to capture related information. The related information may be displayed, for example, overlaid onto a video, embedded within an image or an extended range (XR) file, or simply embedded in an entire webpage. According to embodiments, the contextual information can be embedded in the file that contains the displayed information, for example, embedded in a media file that contains the displayed image. This embedding can be done over a period of time, both using "real-time" data sourcing relevant archived data, or even relevant APIs.

For instance, related content, such as real-time geolocation and computer vision metadata, may be embedded in a media file that contains the image. As another example, an image could be extracted based on an article displayed on a webpage with surrounding contextual information, such as shopping links and valuable text. That information can then be encased, via a blockchain, such as the SoLChain blockchain 120 discussed below, for both spontaneous user interaction, if the user wants to "search" for products in the image, and for future use in machine learning (ML) training around products, etc.

According to embodiments, contextual information may be embedded in or on a media property each time it is published online and provide a contextual record of that media, related interactions and/or conversions. For example, one or more pixels of a media property may be used to store contextual information. This data has value, outside of an additional value proposition via ImagraB 125 (as discussed further below), for example, to convert and sell the media as a non-fungible token (NFT).

Beyond creating a new media/NFT file and metadata standard, embodiments of the invention for interconnecting siloed data can also be used as a standalone browser, reversible from one search/recommendation engine to another, e.g., an embedded audio stream in a .jpeg file can both generate a recommendation for additional audio files and/or .jpeg files, based on overlapping metadata, data clusters, etc. As NFTs in Web 3.0 are exportable and live in a third-party wallet, this allows each NFT to become a contextual search engine/browser of its own.

There are three alternative economic models that may be derived from the search engine SoLSearch's 110 contextual search mechanisms, as described below. None of these business models affect the quality of the search results or the mechanism of the search itself.

shopTHAT: a cart 130 for extracted products with a virtual assistant to remove shopping friction, enhance contextual product search and simplify checkout, as discussed more fully below.

Astarte: an advertising retargeting platform for products browsed in the cart 130 (to replace third party cookies which are being phased out due to privacy laws). Browsed products can be retargeted on the same page or within the same publisher. This platform synchronizes into existing ad exchanges.

SoLView 155 and ImagraB 125: monetization of digital assets through SoLView, contextual data encasing, for example, in a blockchain, using SolChain 120, geo-locative information, shopping links and more. Any of these media assets can be transacted as NFTs via ImagraB 125.

FIGS. 1 and 2 illustrate functional block diagrams of embodiments of the invention which include a web scraper 115, termed SoL(Speed of Light)Scraper. Web scraping, web harvesting, or web data extraction is data scraping used for extracting data from websites. Web scraping software such as SoLScraper may directly access the World Wide Web using the HyperText Transfer Protocol (HTTP) or a web browser. Most prior art scrapers today are used to extract information which is stored (such as in a web index with keywords) or to monitor competitors. SoLScraper 115, in contrast, is used for real-time contextual information extraction, and then assigns the extracted contextual information to various databases: media 135, text 140, shopping links 150 and contextual page data 145, e.g., metadata. According to some embodiments, this contextual information is first structured into silos, and then remains available to create various data overlays, based on real time browsing and archived data.

SoLScraper 115, according to embodiments, is fast enough to, for example, scan both a publisher page in real time, along with valuable hyperlinks (for information or shopping).

According to one embodiment, SoLScraper 115 extracts products for a shopping cart 130, termed herein shopTHAT, as described below.

As illustrated in FIG. 1, SoLScraper 115 fetches web page content and parses it into a document object model (DOM) placed in a DOM tree 117. This allows simple cascading stylesheet (CSS) selectors to be used to find related content for extraction. SoLScraper 115 has numerous rules defined to extract data from different web pages, e.g., to get a product title from a 'span' tag with id 'product-name'. Optionally, rules may apply to specific websites. After which a scoring approach may be used to score confidence of matches. This rule-based approach has the advantages of being fast and lightweight but involves manually tuning rules to websites and maintaining the rules.

After applying the rule-based approach, SoLScraper 115 can use natural language processing (NLP) techniques. Embodiments of the invention contemplate using off-the-shelf methods, for example, available from Natural.js, on the web page content. Content is then tokenized and transformed. Then techniques are applied to extract data, such as nearest neighbor analysis and sentiment analysis.

According to embodiments, a Conditional Random Field (CRF) model is trained on the tokenized document content. The CRF approach can be integrated and implemented within SoLScraper 115 as an alternative or backup to the NLP and rule-based approaches, with the goal being to use the fastest extraction approaches first.

The blockchain protocol was first introduced in 1982 in David Chaum's dissertation "Computer Systems Established, Maintained, and Trusted by Mutually Suspicious Group." Blockchain became popularized through the white paper published by Satoshi Nakamoto in 2008 called "Bitcoin: A Peer-to-Peer Electronic Cash System." In 2009, Bitcoin became the first cryptocurrency using blockchain technology. Since then, blockchain technology has grown by leaps and bounds. There are at least 1000 blockchains that exist today most known, some are not known. A blockchain is a distributed decentralized digital ledger of transactions. The database is managed autonomously through peer-to-peer distributed time-stamping networks. Each transaction that is verified by the blockchain network is timestamped and embedded to a block of transactions. Each block is cryptographically secured by a hash process that links to and incorporates a hash of the previous block, and then it is joined in a chain in chronological order. In order for each block to be created, time-stamping schemes such as proofof-work or proof-of-stake is incorporated to the system to ensure that no single node serializes the changes. If data in the block was tampered with, the blockchain breaks and can be easily identified. This characteristic is not found in traditional databases where information is constantly being modified and deleted with ease. This is the traditional structure of a blockchain and its use.

Blockchain's immutability and decentralization provides integrity of its data. This brings an unprecedented level of trust to the data, proving to users that the information presented has not been tampered with, while transforming audit processes into an efficient, sensible, and cost-effective procedure. Blockchain's benefits means that there is complete data integrity, simplified auditing, increased efficiency, and proof of fault. Thus, blockchain technology is ideal for embodiments of the invention.

A description of the cart 130 termed herein as ShopThat, mentioned above as one of three alternative economic models that may be derived from the search engine SoLSearch's 110 contextual search mechanisms, follows.

Platform Overview. According to embodiments of the invention, the shopTHAT cart 130 fundamentally changes the backend of e-commerce for content creators. Integrating content (article, videos, podcasts etc.) with Product Catalog APIs—the industry standard—is a slow, manual, and retroactive process to populate a shopping cart. As mentioned above, according to embodiments, real time contextual information can dictate and automate a shopping cart, instead of a content creator having to match their content to available products in a marketplace.

Today most publishers revert to affiliate marketplaces or product catalogs to populate a static shopping cart. The availability of products in affiliate marketplaces and product catalogs dictates the very content that journalists produce. Content creators should be able to publish content on the fly and, simultaneously, link any website's product page relevant to that content. Over time if that product becomes out of stock or expired, the shopTHAT cart 130 replaces it with a related product based on its contextual search algorithms. Placing a product link in an article should be the extent of any publisher's ecommerce backend foray. There is no marketplace and no product catalog a content creator needs to integrate with using the shopTHAT cart.

Content, for example, an article, is the context by which the shopTHAT cart 130 is activated. While individual retailers APIs may be used for checkout purposes, according to other embodiments, e-commerce platforms (demandware, woocommerce etc.) can broaden checkouts from individual retail platforms to platform wide checkouts such as Shopify. Alternatively, retailers are also integrated with third party wallets such as Google Pay and Apple Pay, in which extracted product information can be rerouted to via SoLScraper's 115 real time scraper mechanism, discussed above.

Checkout (or not) may be a multiple step integration over time. Embodiments may not check out products but still feature them in the cart and use them as part of the contextual search engine SoLSearch 110. With reference to FIGS. 3-7, the shopTHAT cart 130 has three components, each of which is described more fully below:

ShopThat Widget 305—An embeddable web widget which, among other functionality it provides, deploys SoLScraper 115 and triggers the SoLSearch contextual search engine 110;

ShopThat Product extraction API 310—A real-time retail product extraction via retailer API or SoLScaper 115 scraping;

ShopThat Order API 415—A directly integrated multi-retailer product checkout system, via retail API, retail platform API or third-party wallet.

The ShopThat Widget 305 is a small Javascript web application which resides on ShopThat servers, and embedded into partnered content websites via hyperlinking, according to embodiments of the invention. The ShopThat Widget provides all interaction with general consumers, rendering the ShopThat user interface on top of the content website. The ShopThat Widget performs the collection of possible product URLs from the content website and all communications with the ShopThat APIs. The ShopThat Widget provides the following significant areas of functionality:

Product URL discovery;
Displaying shopping cart based on matched products;
Displaying checkout experience based on products selected in the cart;
Displaying additional products which are related to the products in the shopping cart;
Displaying reviews for products available in the shopping cart and related products; and
Displaying product searching capabilities.

With reference to the embodiment described above with reference to FIGS. 21 and 22, the intent to buy is predominant over the rest of the information associated with selected digital images and the shopping cart should yield shopping information either embedded in the media via an internal product link database, through hyperlinks and other contextual information (field of view, web pages, etc.) or other external databases.

The user can drag a digital image from the media gallery into a shopping cart, such as the shopTHAT shopping cart 130 described herein. Relevant information from the blockchain then automatically populates the shop THAT shopping cart (e.g., image (thumbnail of media type), name, quantity, amount, SKU, description, etc.) The cart in turn automatically updates the pricing subtotal/total. The user may also adjust the quantity in the shopping cart. If a specific product is not identified via hyperlink, an embodiment may assign a contextually relevant product to the digital image. The user may remove a digital image and drag the digital image back to the media gallery for later purchase. This, in turn, reverts the cart information and removes the subtotal/total.

For "image licensing" or "NFT" purposes a user may buy the "image" as a collectible, buy the rights to the images or buy a fraction of the image, all via a blockchain database.

The media gallery interacts with the shopTHAT shopping cart 130 in the following manner, according to an embodiment. Javascript code or the like is placed into a client web site (i.e., art gallery website, shopping site, fashion websites, etc.) to activate the shopTHAT shopping cart. This layer sits on top of the web page as its own interactive layer. The Javascript code allows the client site to communicate with the shopTHAT shopping cart server, private blockchain server, shopTHAT chatbot server, and payment processing system. This encrypted communication allows for frictionless transaction(s) for the user.

The shopping cart may also have an extended feature/functionality that allows users to drag any media from the client's webpage into the user's media gallery 2102 as discussed above. The media gallery allows users to save their favorite media for possible future purchase through the shopTHAT shopping cart checkout system.

The media gallery can have live up-to-date information. If an item that is in the media gallery 2102 is purchased by another user, the user with that media may be notified via various forms of communication, and the media is grayed out in the user's media gallery. If there are multiple copies of the media or items available for sale, the user's media gallery may also notify the user that there is a limited amount left (e.g., three remaining items). This allows users to make an informed decision to purchase the item or not.

The ShopThat Product extraction API 310 is a HTTP REST API which is hosted on ShopThat servers, according to embodiments of the invention. This API is invoked and used by the ShopThat Widget 305 to get information about products. This API is responsible for:

Providing product data matched to discovered products;
Interacting with directly integrated partner retailer's product APIs;
Interacting with SoLScraper 115 functions which can extract product data from web pages in real-time;
Collecting and storing metadata about discovered product URL relationships, for the purpose of recommending related products;
Providing product data for products which are related to given product URLs; and
Providing product review data for product reviews related to a given product URL.

The ShopThat Order API 415 is a HTTP REST API which is hosted on the ShopThat servers, according to embodiments of the invention. This API is invoked and used by the ShopThat Widget 305 to transact the purchase of products across multiple retailers. This API is responsible for:

Taking initial and complete order requests;
Interacting directly with partner retailer's order systems; and
Allowing a consumer to purchase one product from a single retailer or multiple products from multiple retailers.

Figure 3:
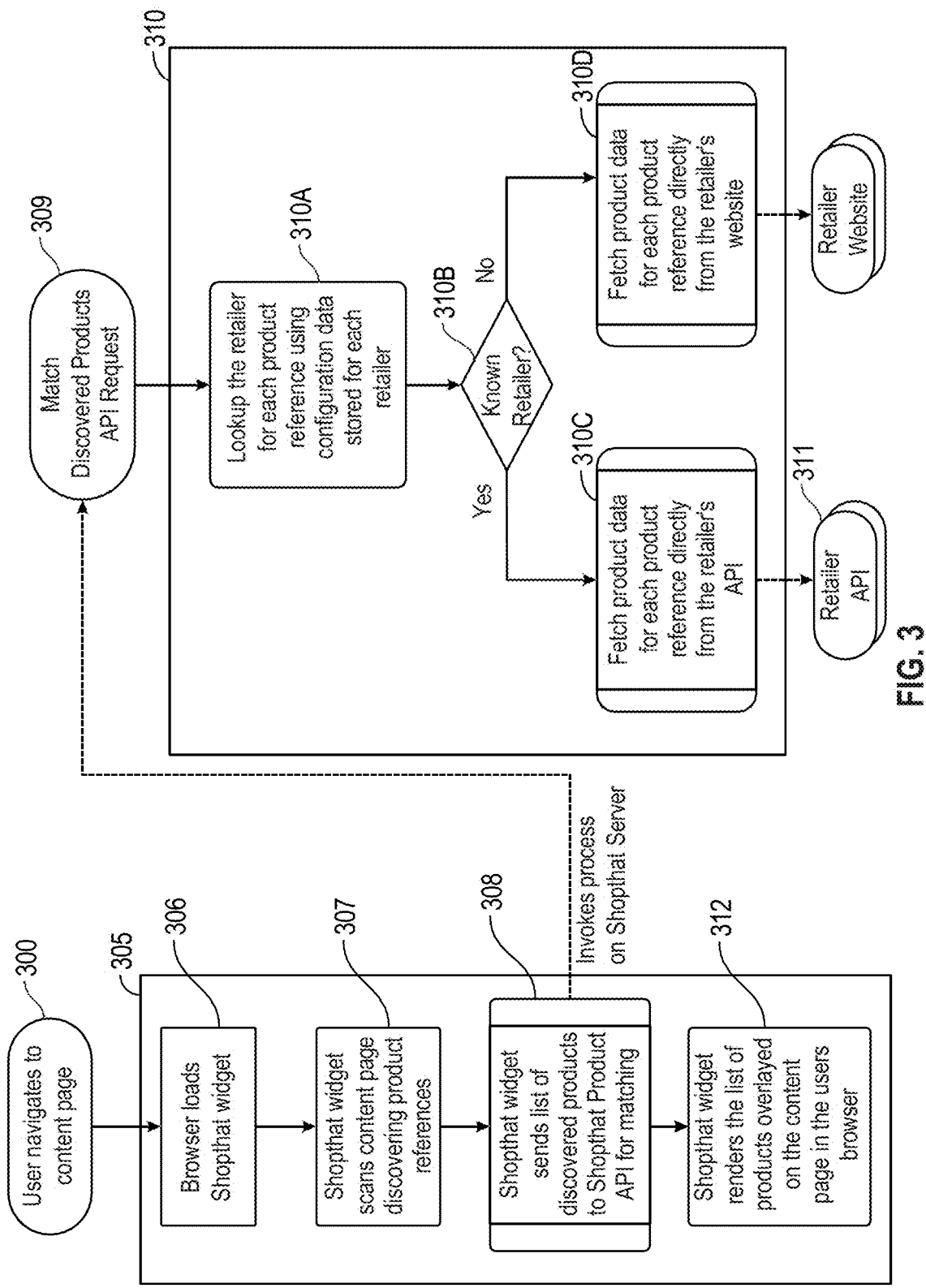
FIG. 3 is a flowchart of the Product Discovery Process according to embodiments of the invention.

FIG. 3 is a flowchart of a product discovery process according to embodiments of the invention. The consumer accesses the ShopThat platform by opening (navigating) to a digital data content page hosted on a partnered Content Creator's website at block 300. When the consumer navigates to a content page in their browser the ShopThat widget 305 which has been integrated into the content page by the Content Creator is loaded and starts executing within the consumer's browser at block 306.

Once the ShopThat widget 305 is executing, it first starts trying to discover any product references on the content page within the browser at block 307, without receiving any user input to perform such discovery. All code and processes here are executed within the browser's Javascript runtime environment, according to an embodiment. The ShopThat widget scans the browsers internal in-memory representation of the content page by traversing the Document Object Model (DOM). The DOM is traversed and prefiltered into an intermediate data structure.

Next, as part of block 307, the ShopThat widget loads a pre-trained Machine Learning (ML) statistical model and uses this to classify and extract product references that exist within the content page. These product references mainly consist of Uniform Resource Locators (URLs) which hyperlink to the product on a retailer website. The product references also include information about the position in the DOM and on the screen of the product, as well as any additional metadata that the ML model has been able to extract and classify.

The ShopThat widget next calls at block 309 the ShopThat Product extraction API service 310 which is part of the ShopThat platform 130 hosted on ShopThat's server infrastructure. The widget passes at block 308 the list of discovered product references to this API. The ShopThat Product extraction API 310 attempts to match each discovered product reference to a product from a partnered retailer according to the steps described in blocks 310A-310D.

Firstly, an attempt is made to match the discovered product reference to a retailer at block 310A using configuration data and pattern matching that the ShopThat platform 130 stored about each partnered retailer. This translates the discovered product reference into a retailer from which the product can be purchased. If a partner retailer is found at block 310A, a decision is made at block 310B for the ShopThat Product API 310 to directly call at block 310C the retailer's integration API 311 to retrieve the detailed information for the discovered product reference. If a partner retailer is not found at block 310A, a decision is made at block 310B for the ShopThat Product API to use a web site scraper to connect to the product URL and attempt to extract machine readable product data in real time from the product web page at block 310D.

This results in data about the product being associated with the discovered product reference and is returned to the ShopThat widget 305. The ShopThat widget now has all information about the products referenced by the content page to be able to display such related information as it wishes at block 312. Though the ShopThat cart 130 may have all the product information within milliseconds of the page loading, the products are only generated in the cart when they have been discovered by the user, whether it is a product link or a product reference in the text, in audio, or in display glasses, etc.

The ShopThat widget 305 according to an embodiment uses this data to render a typical shopping basket cart graphical user interface. According to embodiments, the consumer can remove and set the quantity of products in the cart. The widget, according to other embodiments, can render differing user interfaces, for example rendering product purchase options on the page where products are referenced in the content. The data returned from the Product API is used to build the user interface of the product and this is injected into the browser DOM to be displayed to the consumer.

Figure 4:
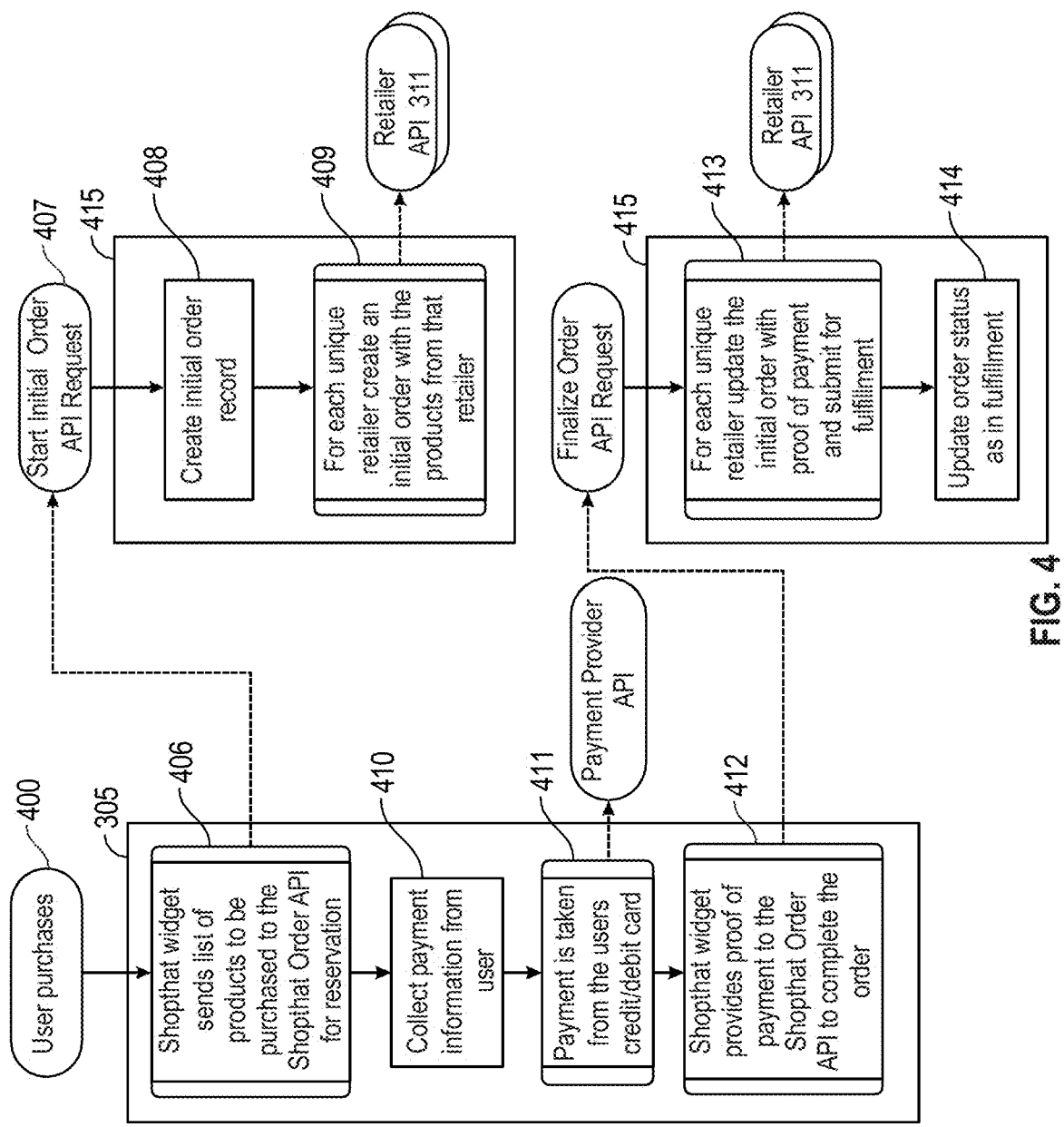
FIG. 4 is a flowchart of the Product Order Process according to embodiments of the invention.

FIG. 4 is a flowchart of a product order process according to embodiments of the invention. When a consumer, via user input, opts at block 400 to purchase the products that they have added to their ShopThat cart 130, the ShopThat widget 305 contacts the ShopThat Order API 415—a part of the ShopThat platform 130 hosted on ShopThat's server infrastructure. The ShopThat widget 305 provides at block 406 the ShopThat Order API 415 with a list of products that the consumer wants to purchase and creates an initial order. For each unique retailer within the initial order, the ShopThat Order API 415 directly calls at block 407 the retailer's integration API to create a corresponding initial order at block 408. This has the purpose of checking and reserving stock with the retailer for a period of time. The ShopThat Order API records the state of each retailer's initial order into its own order database at block 409.

Next, at block 410, the ShopThat widget 305 collects payment information from the consumer and calls a payment provider API to perform the card payment at block 411. When the card payment is taken successfully, the ShopThat widget 305 invokes the ShopThat Order API with the payment authorization data to finalize the order at block 412. This causes the ShopThat Order API 415 to update each corresponding retailer's initial order with the payment authorization to transition the initial order into an order ready for fulfillment, updating the records kept in the ShopThat order database at block 413. At this point the transaction with the consumer is complete and each retailer fulfills the order in the normal course of their business practices at block 414.

It is possible for the ShopThat platform 130 to have discovered products which cannot be purchased via the platform and the direct multi-retailer integration APIs. This is especially true for products the platform may not initially be authorized to sell. In this situation, users are presented with the ability to purchase the item via referral to the retailer's website, whereby the user follows a hyperlink to the retailer's own website and checkout systems.

The growth and integration of payment buttons (such as Apple Pay and Google Pay) offers another route and opportunity for the ShopThat platform 130 to be able to integrate with retailers for checkout purposes. The ShopThat platform may make use of these payment mechanisms and underlying APIs to allow direct purchase of products upon referral. In this situation, the ShopThat platform 130 could act as the source of the payment and shipping data, acting as a bridge between the user, payment processor and retailer.

Figure 5:
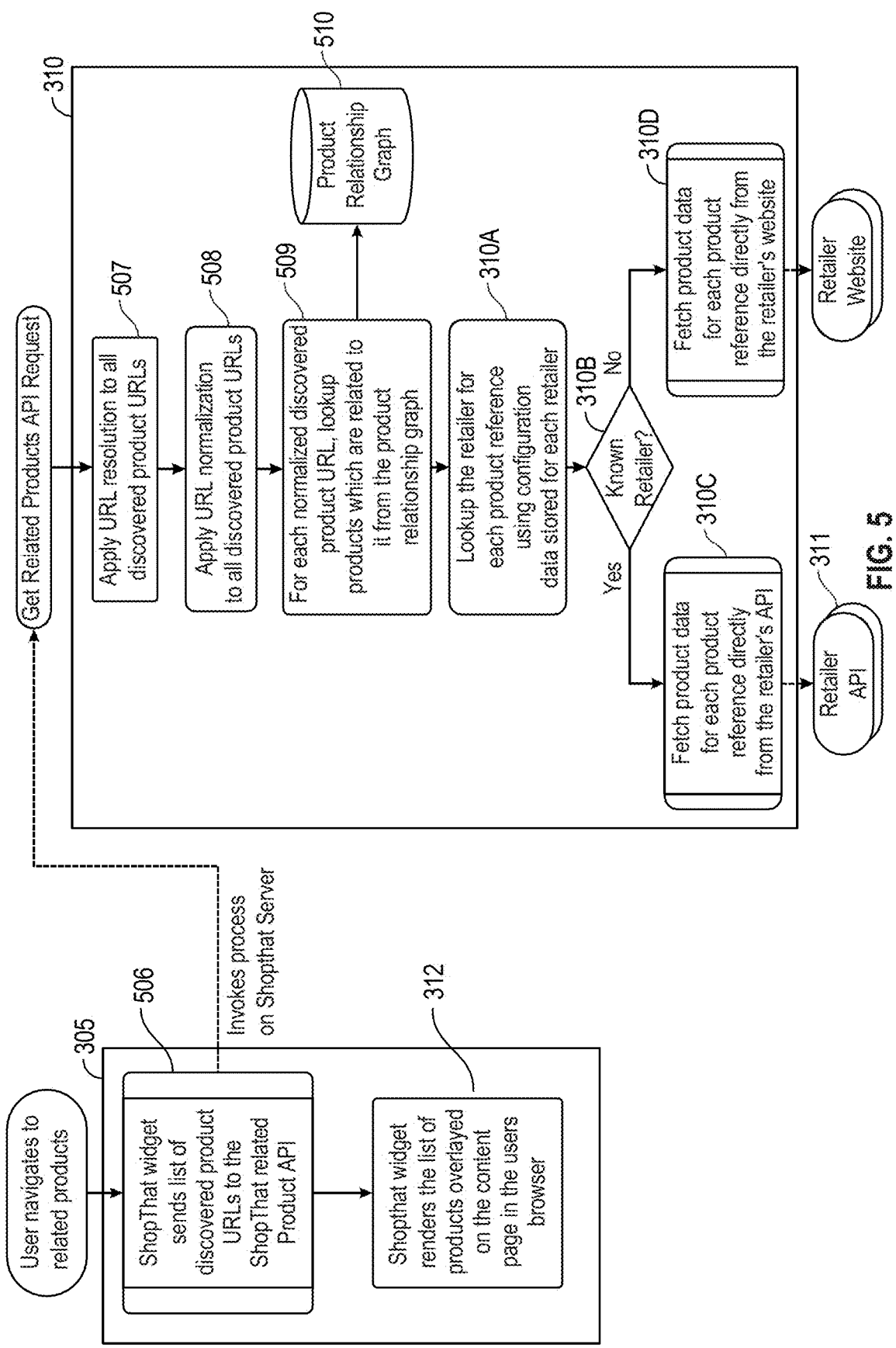
FIG. 5 is a flowchart of the Related Products Process according to embodiments of the invention.

FIG. 5 is a flowchart of a related products process according to embodiments of the invention. The ShopThat platform 130 builds information about which products are related to other products at block 506. This information is then used to provide cross-selling experiences in the ShopThat Widget 305. The relationships between products are learned from a number of different data sources, which are collected from different parts of the ShopThat platform:

Products which are linked to from the same content page, collected by the ShopThat Product extraction API 310;
Products which are brought together, collected by the ShopThat checkout API 415; and
Products which are categorized together, collected by the ShopThat product search system, SoLSearch 110.

The product relationship data from the various sources is collected, aggregated and analysed by the ShopThat platform 130 to build a graph of product relationships 510, which is, in turn, used to suggest related products upon request. The ShopThat platform only stores product metadata such as URLs and the relationship between them, according to one embodiment. In such an embodiment, the ShopThat platform does not store any product data, nor is any normalized product data used in the product relationship building process.

An aspect of the product relationship graph is ensuring that there is a normalized view of a product URL, as this allows for products to be consistently identified despite the differing ways that website may refer to those products. The following steps are applied to all URLs used within the product relationship graph:

URL resolution at block 507—this ensures that a URL is resolved to its intended target, rather than a URL redirection service; and
URL normalization at block 508—this ensures that a URL is a consistent reference for a product.

URL resolution aims to get around problems introduced by often used URL redirection services. In this situation, the URL needs to be translated to the actual target rather than the intermediary redirection service. Embodiments perform this in two ways, firstly by applying a rule set of known common URL redirection services. Secondly by connecting to the URL redirection service and following the result, learning redirection rules when it can.

URL normalization aims to ensure that a product URL is always consistently formed. URLs can have a number of inconsistencies which need to be removed:

Query parameters in inconsistent order;
Additional tracking parameters appended; and
Differing domain names used.

The URL normalization process 508 applies a series of rules to simplify and consistently form a URL for the purpose of storing it within a product relationship graph 510.

It is possible that a product name may be referred to without a link, in which case embodiments may also be able to create a link to a retailer website based on its archived retail web index, for example, generating the URL based on natural language processing (NLP) techniques.

When the ShopThat widget 305 wishes to display related products, it performs an API request against the related products endpoint of the ShopThat Product extraction API 310. The widget transmits the full list of discovered product URLs to which related products will be matched at block 506. The ShopThat server applies the URL resolution and normalization processes (at respective blocks 507 and 508) to each discovered product URL. Each of these normalized URLs is then looked up in the product relationship graph 510 and the related products for any known discovered products are returned at block 509. The product relationship graph only returns a URL for the related product, no product data is stored or returned at this stage.

The ShopThat platform 130 next, in real time, fetches the product data for every product URL of a related product, in the same manner as described above with reference to blocks 310A-310D in FIG. 3. As such the ShopThat platform performs similar processes as used during the product matching process to get the data for each product. Doing so involves directly calling the third party partnered retail's APIs 311. In some cases, a web page scraping function may be invoked to extract product data directly from reference product web pages.

Figure 6:
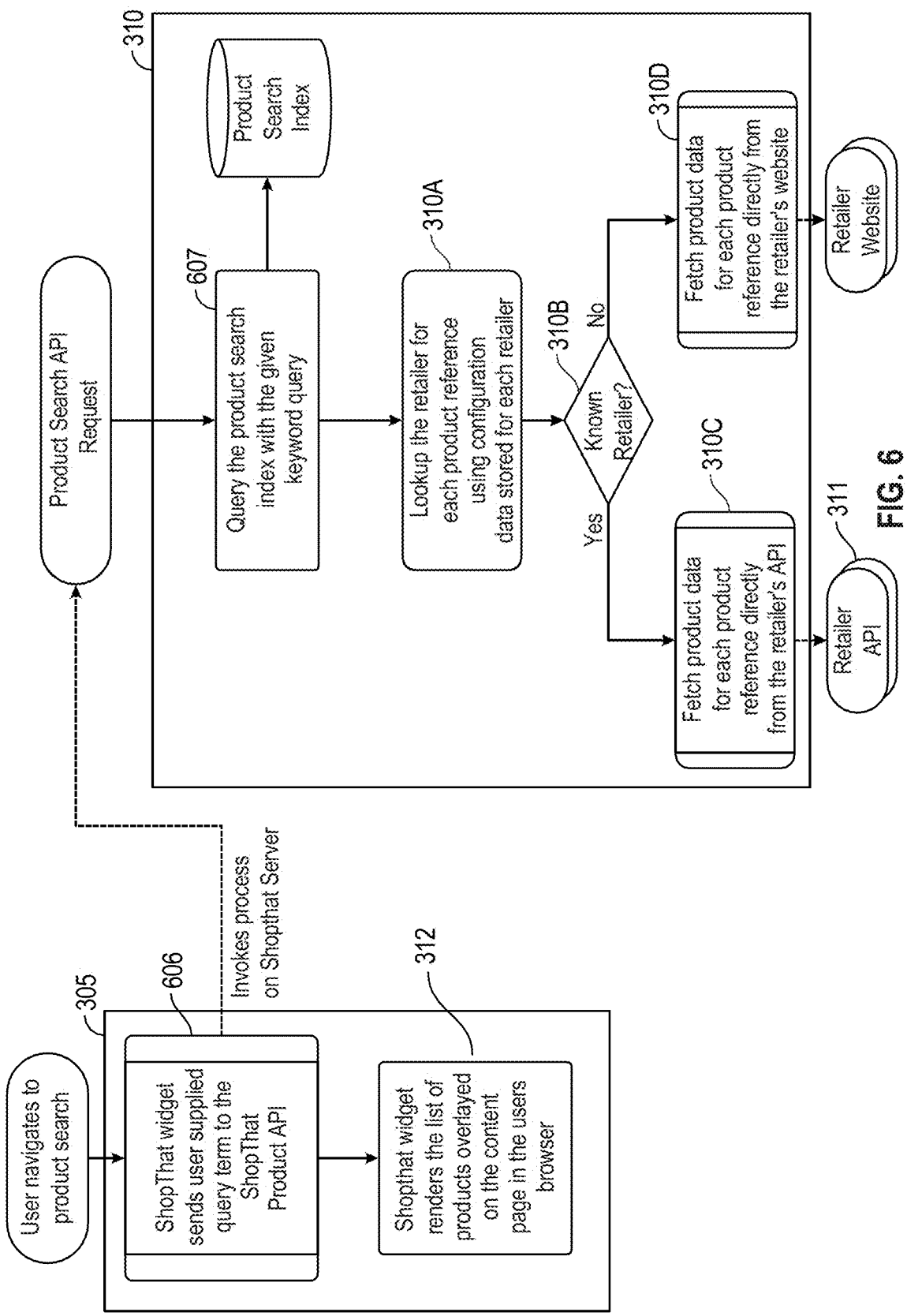
FIG. 6 is a flowchart for Looking Up Related Products according to embodiments of the invention.

FIG. 6 is a flowchart for a product search process according to embodiments of the invention. The ShopThat platform 130 provides the capability to search for products based upon:

Keywords of product name and description (full text search);
Retailer supplied product tags; and
Product classification and categorization.

The Shopthat platform 130 does this without holding any normalized product data, instead only indexing keywords to product URL metadata. The platform then reuses similar processes to that used to match discovered products to get the product data for each index hit. A product search index is populated with data from multiple sources:

Products retrieved from partnered retailer's catalogue systems;
Products discovered by the product matching process; and
Product classification and categorization made via Machine Learning processes.

This data is primarily collected passively by the ShopThat Product extraction API 310 and stored into the index mapping keyword to product URL. The lookup process is as follows. When the ShopThat widget 305 wishes to search for products, it performs an API request against the product search endpoint of the ShopThat Product extraction API. The widget transmits a query of words to search for at block 606. This query may also specify how those words are to be combined with Boolean AND and OR operators. The given query is used to search the keyword index which has been built at block 607. The index returns a set of product URLs which have been matched to the given query. The ShopThat platform 130 next, in real time, fetches the product data for every product URL of a product search. As such, the ShopThat platform performs similar processes described above with reference to blocks 310A-310D in FIG. 3 and as used during the product matching and related product processes to get the data for each product. This involves directly calling the third party partnered retail's APIs 311. In some cases, a web page scraping function may be invoked to extract product data directly from reference product web pages.

The above-described embodiments of the ShopThat Widget 305 provide a very traditional shopping experience with the typical shopping cart pattern. Yet the unique position of the ShopThat Widget being embedded directly into content websites presents a range of alternative embodiments for user interfaces. One such embodiment is to provide contextual product information overlays and ordering capabilities. The ShopThat widget in such an embodiment uses the related information about products to augment the content on a web page, displaying information about products contextually where the product is mentioned within the web page. This additionally enables purchasing of the product from this contextual user interface.

Another embodiment provides for product price optimization. The ShopThat platform's capabilities to perform multi-retailer product purchasing also facilitates the possibility of selecting the best price for a given product. In such an embodiment, the Shopthat platform 130 matches up products across different retailers and then orders the given 'unified' product from the retailer offering the best price/service at the time of purchase for a consumer.

Figure 7:
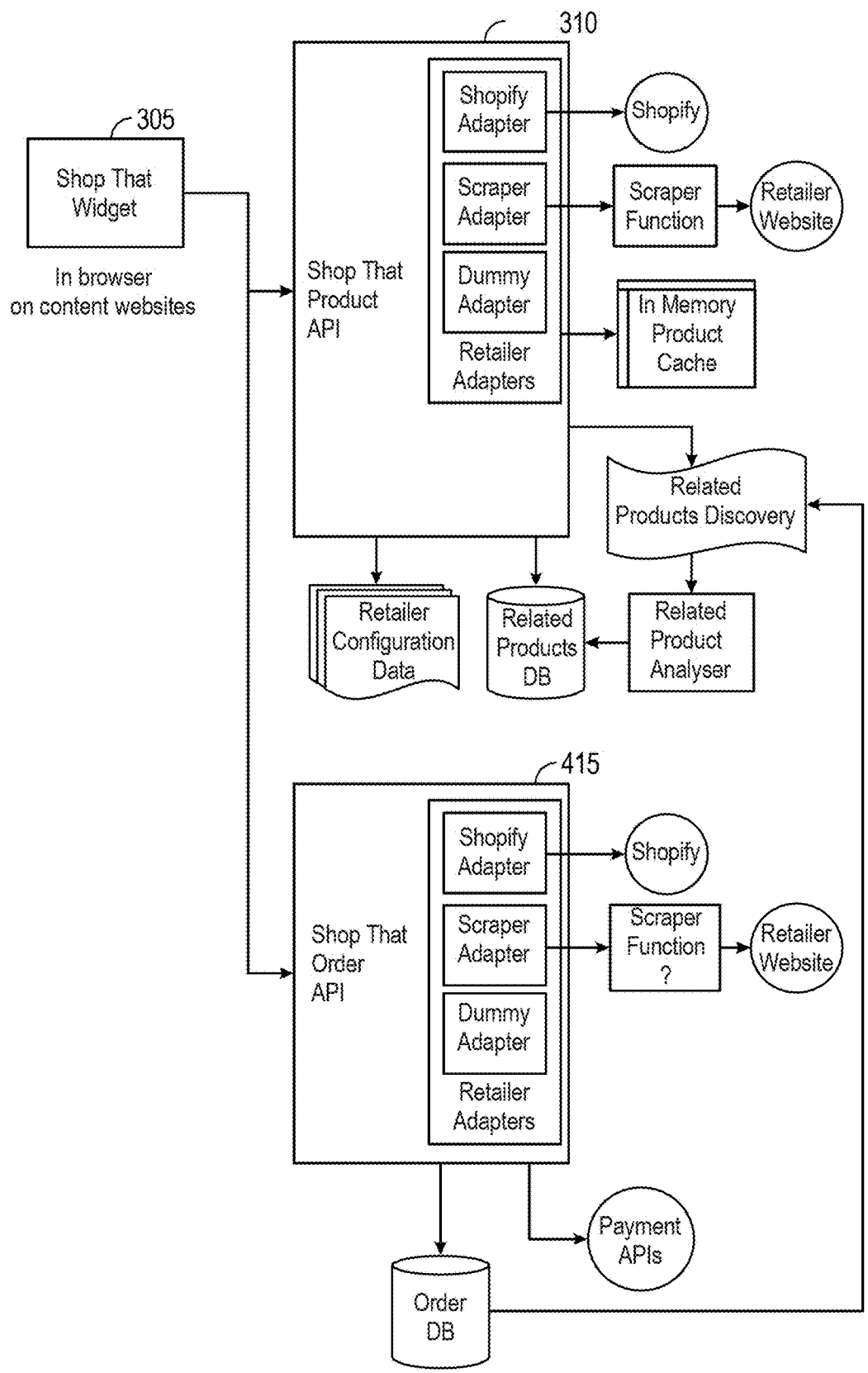
FIG. 7 is a functional block diagram of the ShopThat Platform Architecture, according to an embodiment.

FIG. 7 is a functional block diagram of the ShopThat platform 130 architecture, according to an embodiment.

A description of SoLView 155, another one of the three economic models referred to above that make use of the search engine SoLSearch's contextual search mechanisms, follows.

Metadata is embedded in all types of media: images, videos, audio, documents, etc. The metadata is used to provide, for example, descriptive information, structural information, administrative information, reference information, statistical information, and legal information about the media. A new class of metadata is being proposed that consists of all the aforementioned types of information and includes seven new interactive layers of information. These layers are purchasable (shopping) links, contextual information of the media, all related media link information, geo-location/URL use-tracking, pixel tracking/watermarking, and non-fungible tokens (NFTs). Each layer can operate independently of each other and can work together.

Additionally, metadata is very close to its counterpart "microdata" for web pages. Microdata is a Web Hypertext Application Technology Working Group (WHATWG) Hypertext Markup Language (HTML) specification used to nest metadata within existing content on web pages. Search engines, web crawlers, and browsers can extract and process microdata from a web page and use it to provide a richer browsing experience for users. This microdata is often used for Search Engine Optimization (SEO) purposes in search engines. Embodiments can use the same foundational technology to embed information into a whole web page and use it for contextual search purposes.

Figure 8:
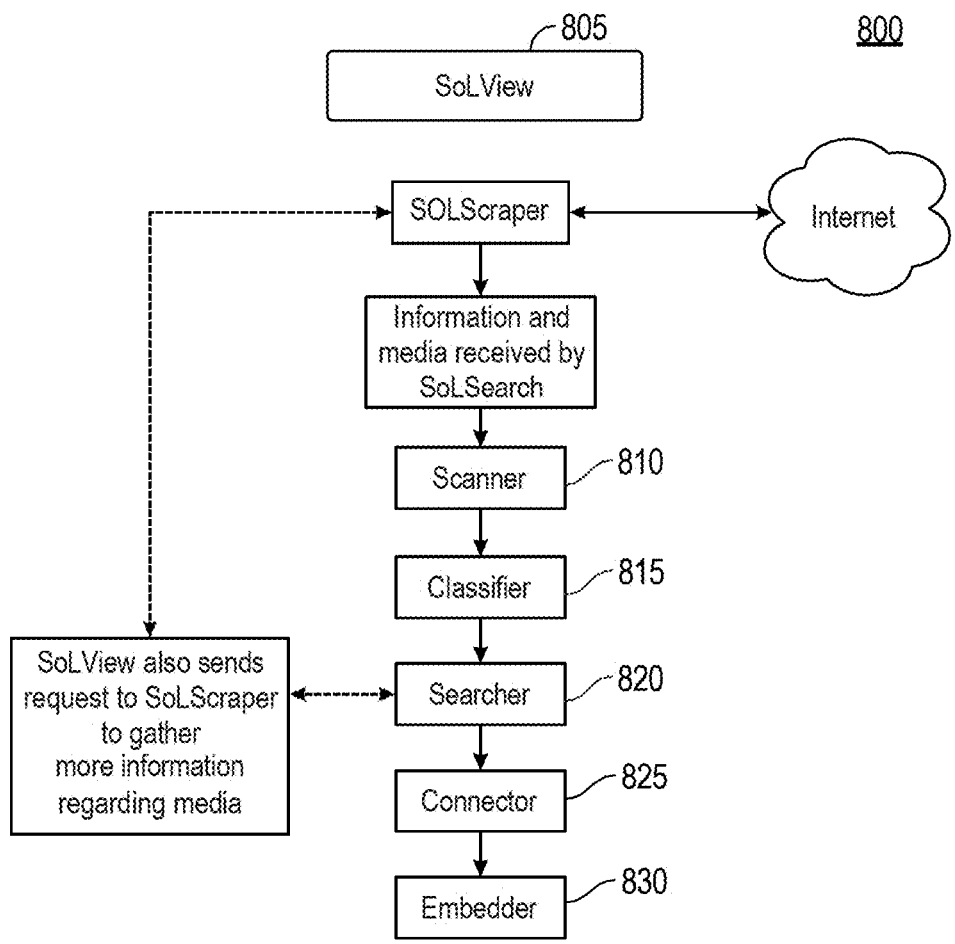
FIG. 8 depicts embodiments of the invention including a layered information metadata automation engine termed the SoLView engine.

As depicted in FIG. 8, embodiments of the invention 800 include a layered information metadata automation engine 805 termed herein as the SoLView engine, or simply SoLView. SoLView uses machine learning, deep learning, and artificial intelligence to automatically scan, identify, classify, and embed critical metadata information into a media file. SoLView works in conjunction with the ImagraB NFT minting engine as described, for example, in U.S. patent application Ser. No. 17/666,788, filed Feb. 8, 2022, entitled "BLOCKCHAIN BRIDGE SYSTEMS, METHODS, AND STORAGE MEDIA FOR TRADING NON-FUNGIBLE TOKEN" the disclosure of which is incorporated by reference herein in its entirety, to automatically generate and add an NFT layer inside a media file. By automating this process, all media passing through the platform has the proper information embedded within the preexisting file types.

The SoLView engine supports, but is not limited to, the following file formats and automatically scans (block 810), classifies (block 815), and embeds (block 830) metadata information inside the following file formats:

Image File Formats: JPEG, PNG, SVG, GIF;
Video File Formats: WEBM, MPG, MP2, MPEG, MPE, MPV, OGG, MP4, M4P, M4V, AVI, WMV, MOV, QT, FAV, SWF, AVCHD;
Audio File Formats: MP3, M4A, AAC, GGA, FLAC, AIFF, WMA, ASF, WAV, VQF, MP2, APE, RA, MINI;
Document File Formats: DOC, PDF, TXT, RTF;
Webpage: HTML (automate SEO).

Figure 9:
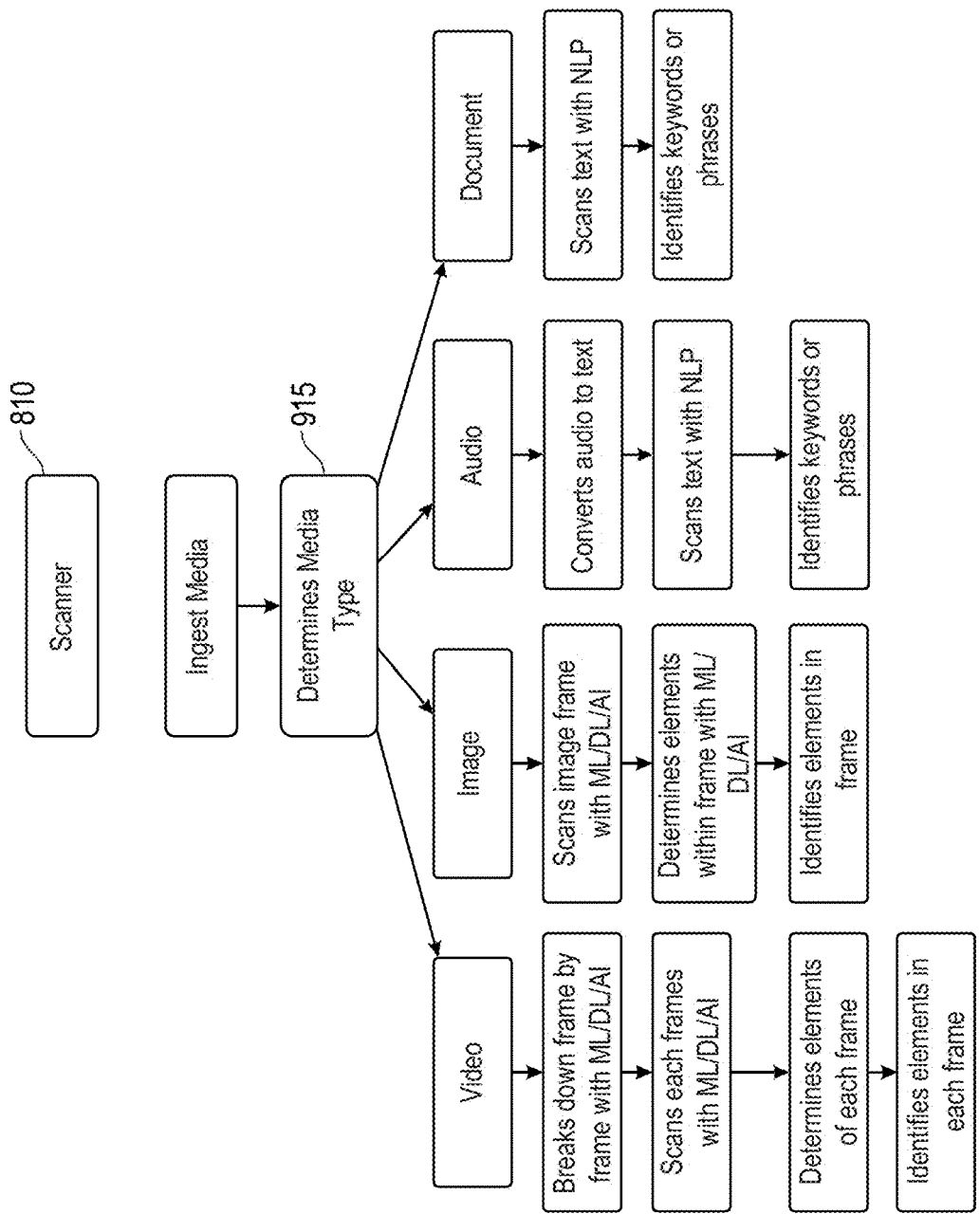
FIG. 9 is a flowchart of the ML/DL/AI scanner for analyzing pixels in media and detecting objects within the media according to embodiments of the invention.

As illustrated in FIGS. 8 and 9, the SoLView engine 805 applies Machine Learning (ML), Deep Learning (DL), and Artificial Intelligence (AI). An ML/DL/AI engine scans media to detect elements in the media. The SoLView engine uses ML/DL/AI and comprises a scanner 810, identifier 915, classifier 815, searcher 820, connector 825, and embedder 830, each of which is described below.

Scanner 810 (FIG. 9): The ML/DL/AI scanner analyzes every pixel in the media and detects objects within the media.

Figure 10:
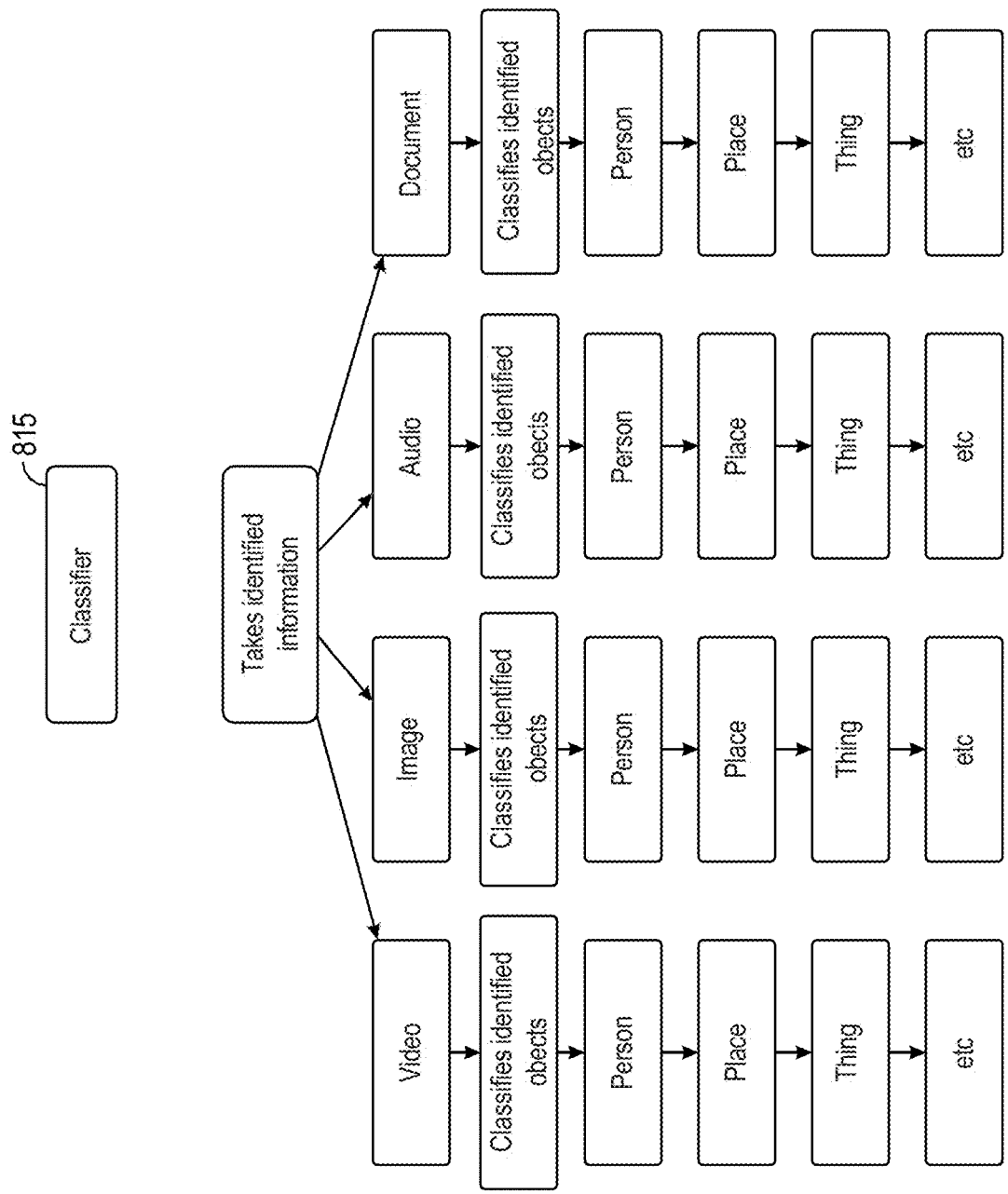
FIG. 10 is a flowchart of the ML/DL/AI classifier that takes the identified scanned objects and classifies each object according to embodiments of the invention.

Classifier 815 (FIG. 10): The ML/DL/AI classifier takes the identified scanned objects and classifies each object.

Figure 11:
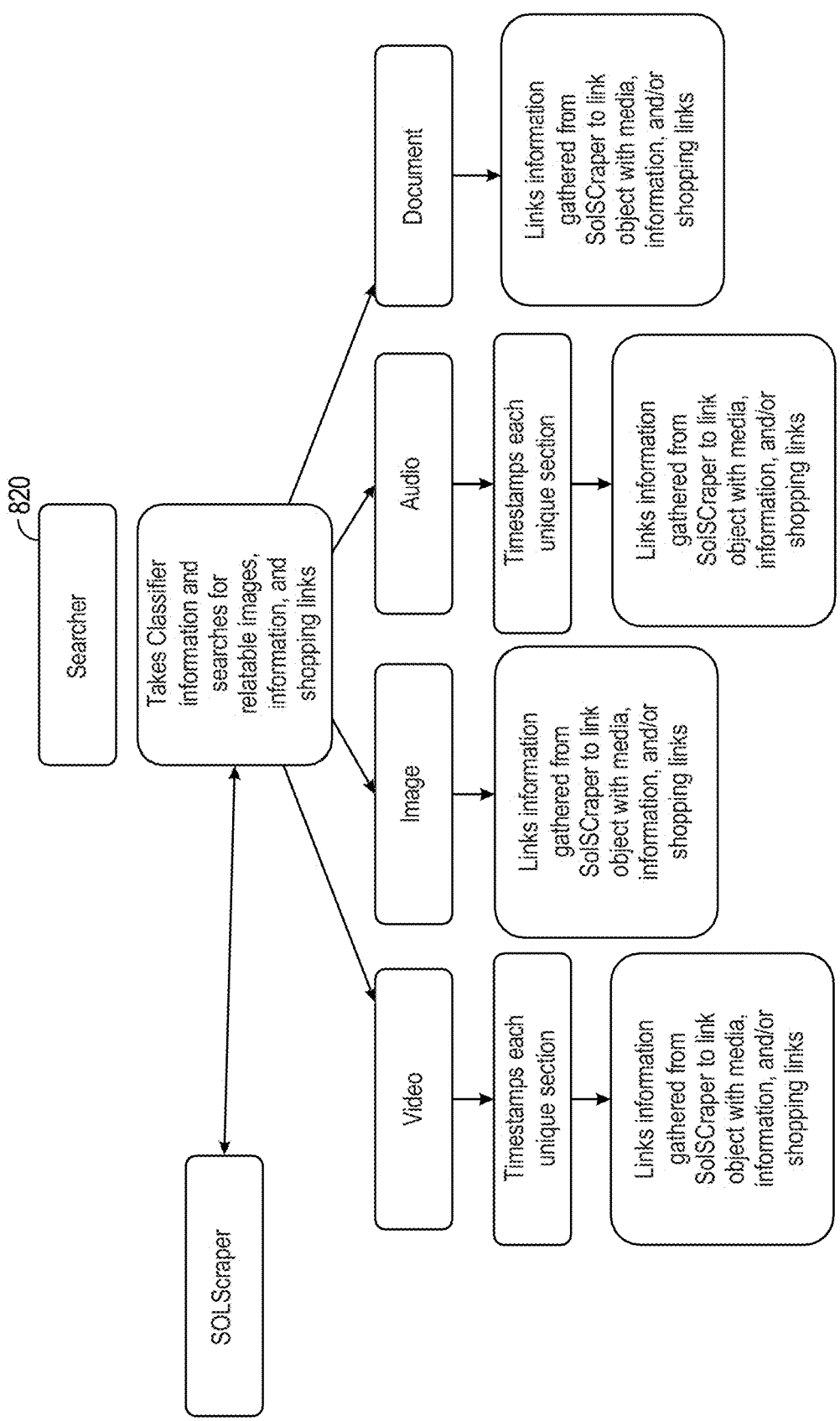
FIG. 11 is a flowchart of the ML/DL/AI searcher that crawls for reference materials pertaining to each object according to embodiments of the invention.

Searcher 820 (FIG. 11): The ML/DL/AI searcher crawls for reference materials pertaining to each object.

Figure 12:
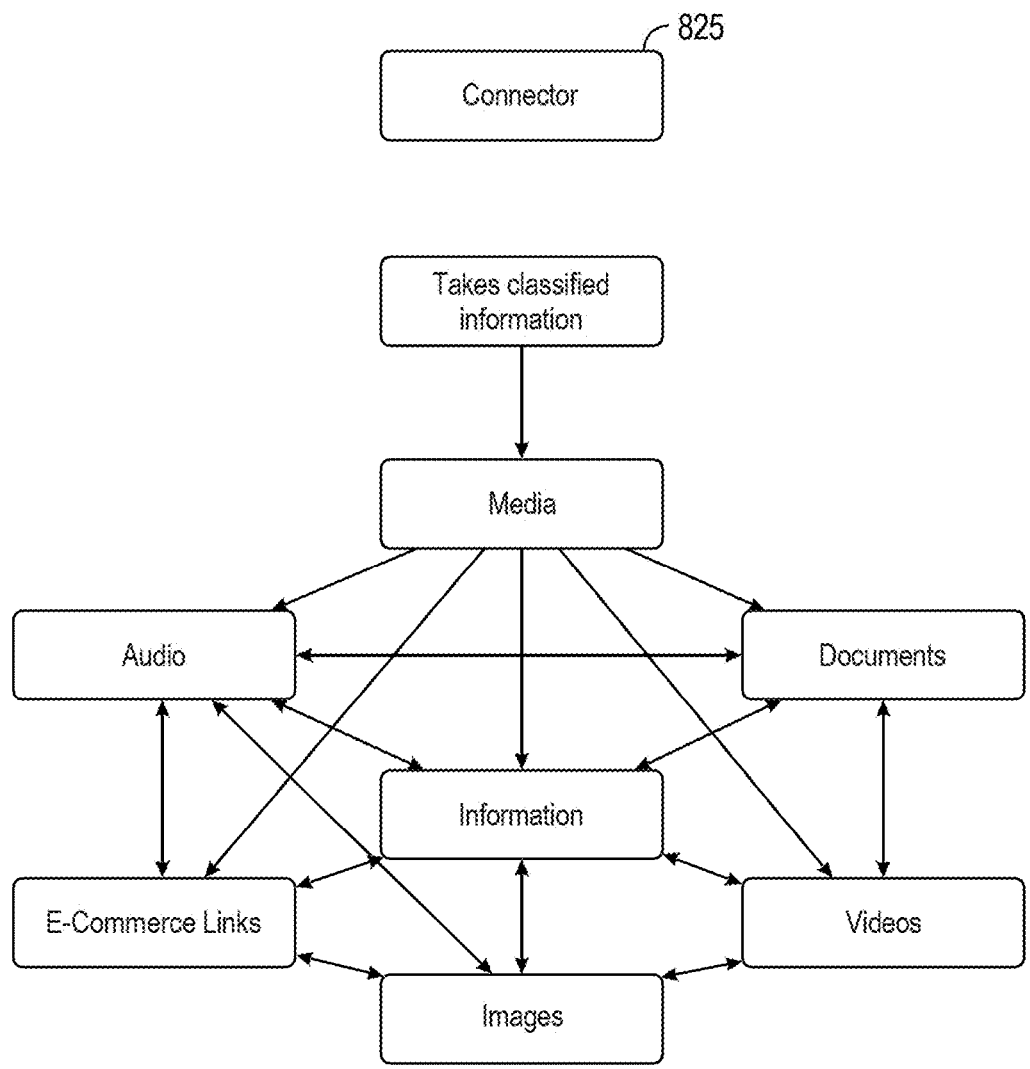
FIG. 12 is a flowchart of the ML/DL/AI connector that connects and references all the objects along with the information gathered and links everything together according to embodiments of the invention.

Connector 825 (FIG. 12): The ML/DL/AI connector connects and references all the objects along with the information gathered and links everything together.

Figure 13:
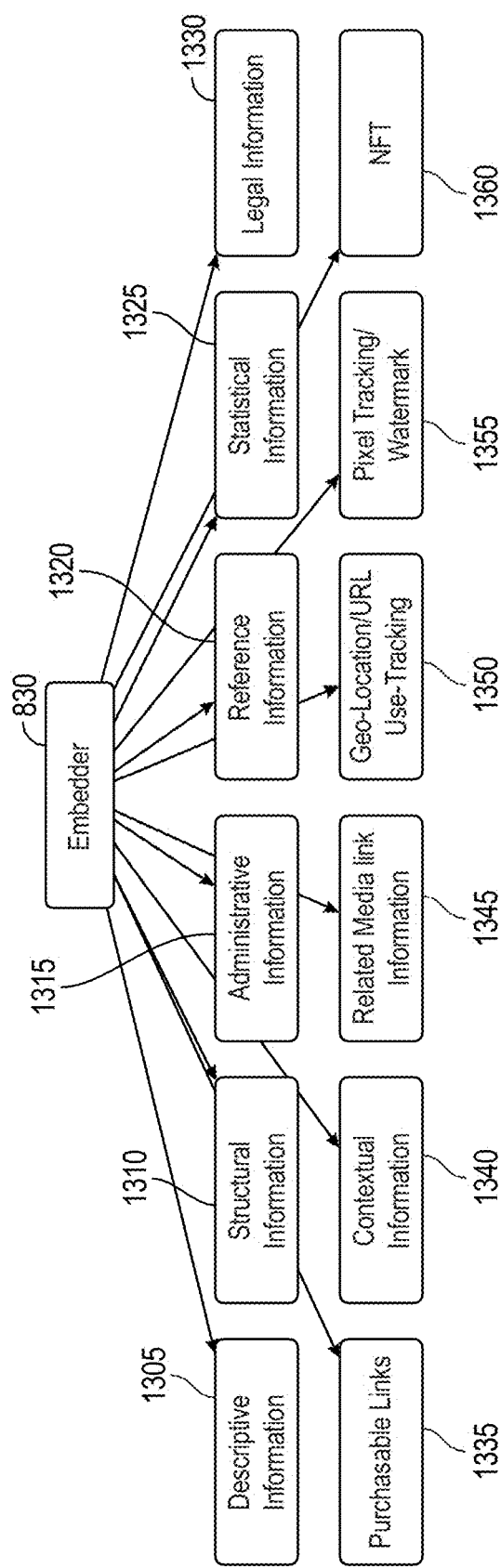
FIG. 13 is a flowchart of the ML/DL/AI embedder that takes the information from the classifier, searcher, and connector and embeds the information inside of a media file according to embodiments of the invention.

Embedder 830 (FIG. 13): The ML/DL/AI embedder takes all the information from the classifier 815, searcher 820, and connector 825 and embeds the information inside of the media file. The information is embedded within the media by adding metadata in layers, according to embodiments. The layers include:

Descriptive Information 1305—This layer provides a short and long description of the contents within the media file encompassing bits of all the information below.

Structural Information 1310—This layer provides structural information about the file such as format, the codec, compression, and pixel dimensions.

Administrative Information 1315—This layer provides dates and specific EXIF (exchangeable image file) data of the media (usually found in photos).

Reference Information 1320—This layer provides information that supports external media used in this media file.

Statistical Information 1325—This layer facilitates sharing, querying, and understanding of statistical data over the lifetime of the data.

Legal Information 1330—This layer includes copyright data, legal use terms, and referenced to any special conditions.

Purchasable (shopping) Links 1335—This layer provides a central link to all available purchases the media has to offer.

Contextual Information of the Media 1340—This layer provides a central link to all available information within this media such as location, people, objects, music etc.

All Related Media Link Information 1345—This layer provides more contextual information of related external media that this media is connected to.

Geo-Location/URL Use-Tracking 1350—This layer holds geo-location data and tracking data to query location and use.

Pixel Tracking/Watermark 1355—This layer tracks user behavior, site conversions, web traffic, and other metrics.

Non-fungible token (NFT) 1360—This layer is an embedded NFT that shows proof that this media is authentic and not a clone. This layer is tamper-proof and cannot be modified. Modifying this layer voids its authenticity.

Figure 14:
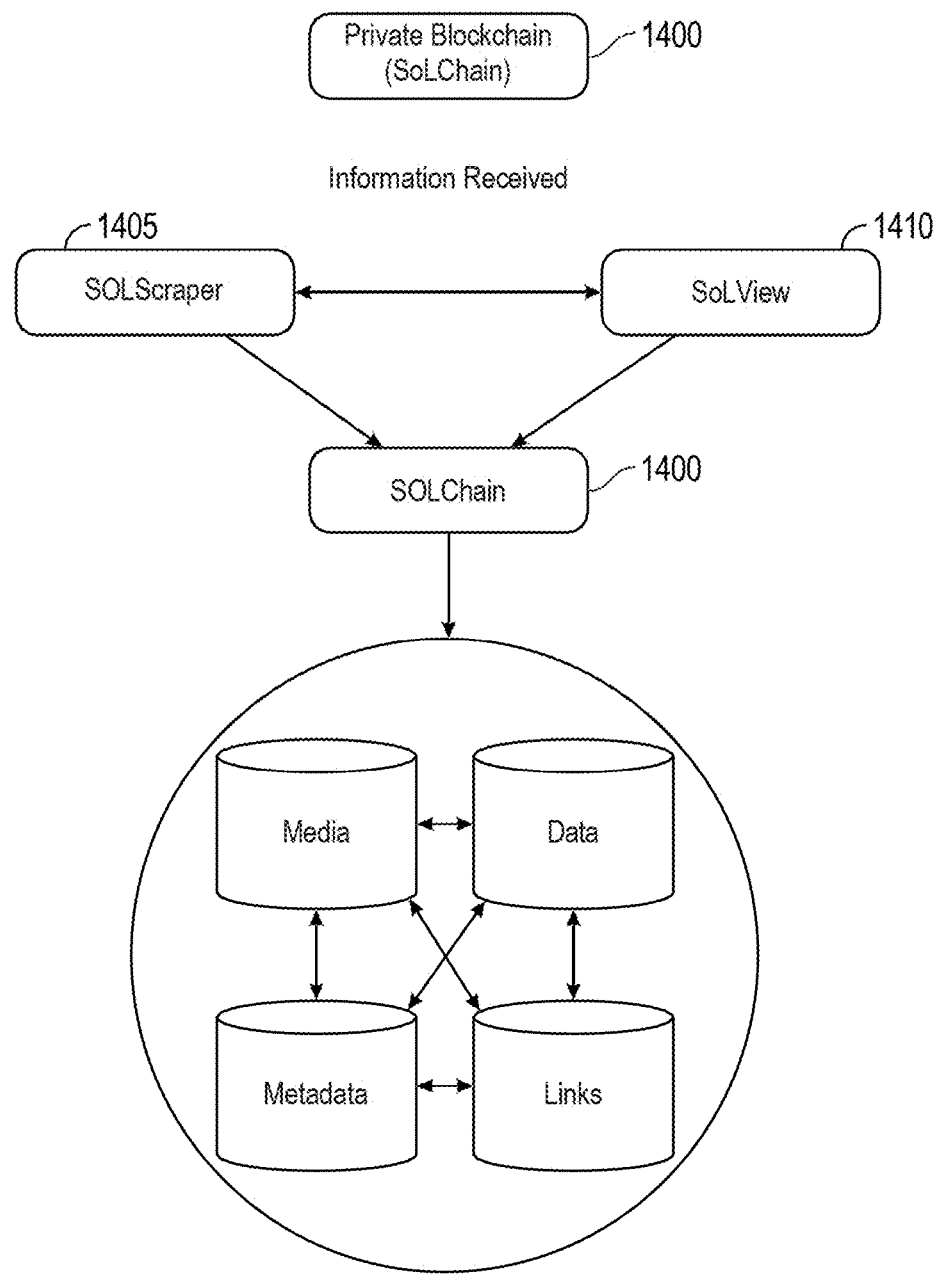
FIG. 14 is a functional block diagram of a private datastore blockchain, termed SoLChain, according to embodiments of the invention.

FIG. 14 is a functional block diagram of a private datastore blockchain 1400, termed SoLChain 120, according to embodiments of the invention. SoLChain is the underlying blockchain technology that holds all the generated data produced by the SoLScraper 1405, SoLView engine 1410, and the ImagraB NFT generator, according to embodiments. SoLChain is a private multi-tiered-blockchain unlike any other blockchain. Most blockchains today only holds transaction interactions between two accounts and account information for each owner/wallet. SoLChain holds layered information for each piece of data generated by the SoLScraper, SoLView engine, and the ImagraB NFT generator and automatically links all the information together.

SoLChain 120 is a private multi-tied distributed blockchain that uses a two-factor proof-of-authority and proof-of-identity to ensure that the information is authentic, validated, immutable, and properly linked. This type of blockchain does not require as many energy resources as other blockchains using proof-of-work or proof-of-stake. By having a two-factor proofing system, it not only creates a check and balance for data to be written to the blockchain, but it ensures that those that are able to write to the blockchain do not corrupt the blockchain with false data.

Embodiments use this particular blockchain because there is currently no similar blockchain technology in use. Prior art blockchains only focus on account information and transaction information, while the focus of the blockchain according to embodiments of the invention is on links and contextual information linked to a particular object. The purpose of the blockchain is to create and catalog every type of media with contextual information, building a universal library of immutable information and linking all information and media together like never before.

According to some embodiments, SoLChain 1400 has an API component that allows third party users to develop their own application to write to the blockchain. The blockchain records third party activities and their contribution to the blockchain.

SoLChain 120 has its own cryptocurrency for internal utility use. Users of the platform can earn SoLCoins by using the platform.

Figure 15:
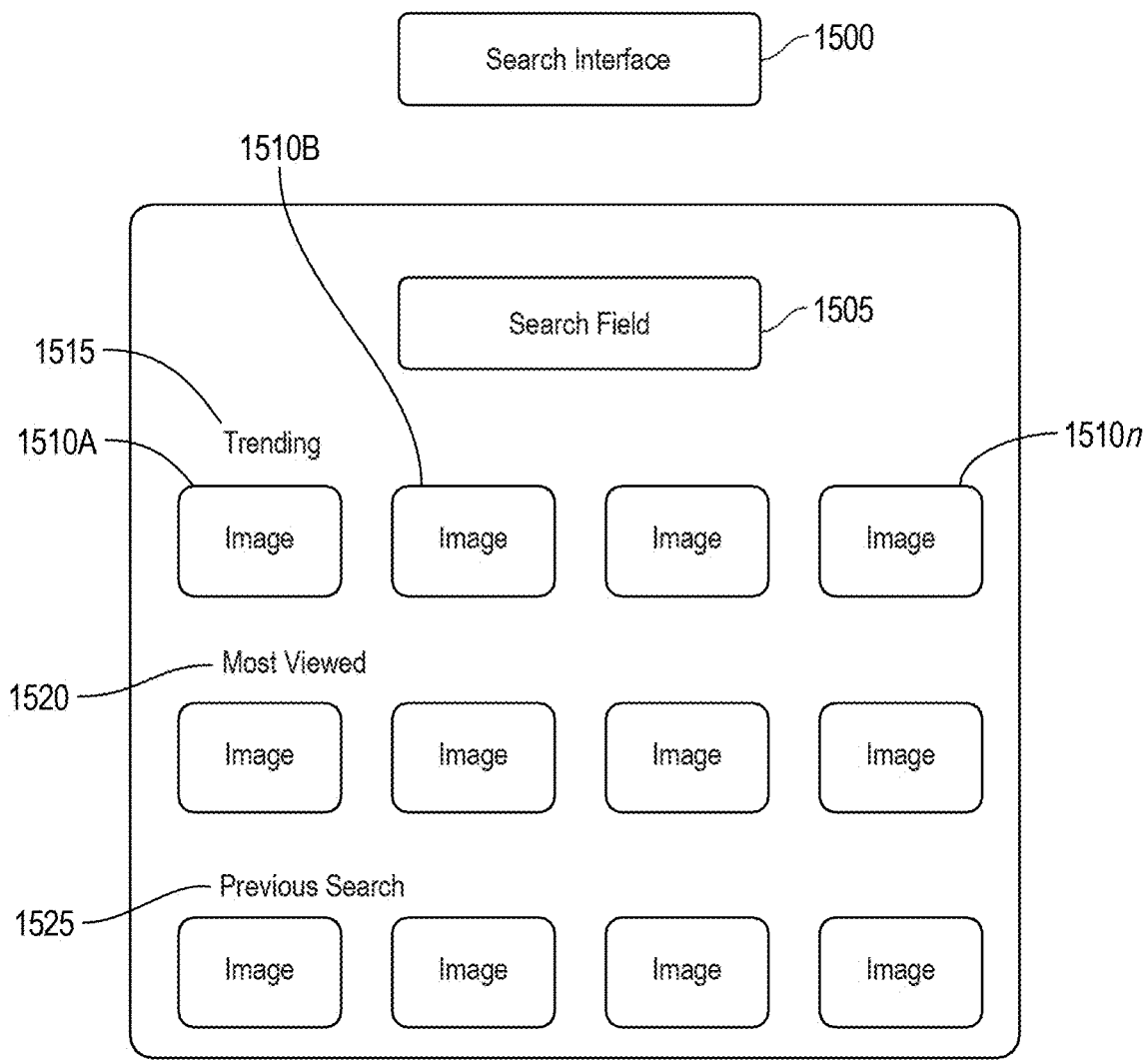
FIG. 15 illustrates an interface for the search engine SoLSearch according to embodiments of the invention.
Figure 16:
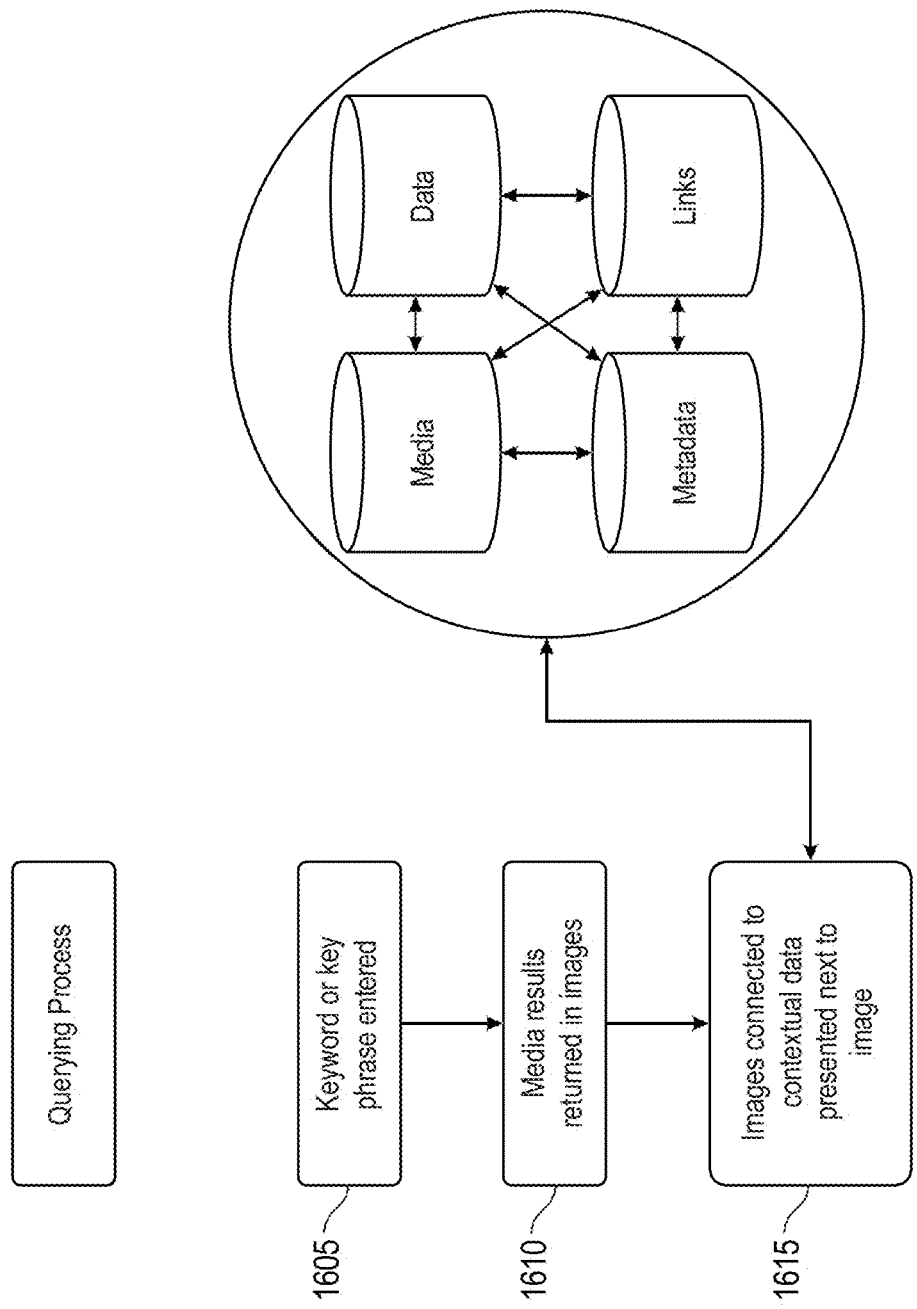
FIG. 16 is a flowchart for the Use of Context Vectors in Query Processing according to embodiments of the invention.

As previously mentioned, SoLView 155 makes use of the contextual search engine SoLSearch 110. The search engine SoLSearch scans "a context" in real time using SoLScraper 115. For the purposes of SoLView and the use of metadata encased media, SoLSearch can also be a media-based contextual search engine. It is based on all the aforementioned technologies. It allows users to search the blockchain for media of every type with the use of keywords or key phrases. The results of the search are displayed in a series of images that matches best with the user's input. With reference to FIGS. 15 and 16, an interface 1500 for the search engine SoLSearch is depicted and works as follows in this embodiment. A user first types in keywords or key phrases at block 1605 into a search field 1505. Results returned at block 1610 show a series of images 1510A, 1510B, ... 1510$n$ that best matches the keywords or phrases. These results may be categorized or sorted based on various factors, such as trending images 1515, most viewed images 1520, or previously search images 1525. Note these images also represent other types of media such as video, audio, or document files. The user may then select an image that appeals or matches most to their search. An exploratory view then appears that shows the media and all the primary contextual information pertaining to that media at block 1615. Users may drill down to see secondary, tertiary, quaternary, etc., information.

Users can click on the media to either investigate it further or click on the contextual information or other associated media next to the main media to further explore more information. If the media is a video or an audio file, as the media is playing, the contextual information that is associated to that media changes as the timeline of the media changes because every visual "scene" or "portion" of that media that is being displayed has new types of information associated, therefore, updating the contextual information, associated media, and links.

Users can explore the contextual information further by clicking on the active links to provide more contextual information of other media that may be linked to that contextual data. This works in the same manner with document type files. Users can preview the document as displayed and as users scroll through the document, new contextual information or media is displayed next to the document relating to the document.

Figure 17:
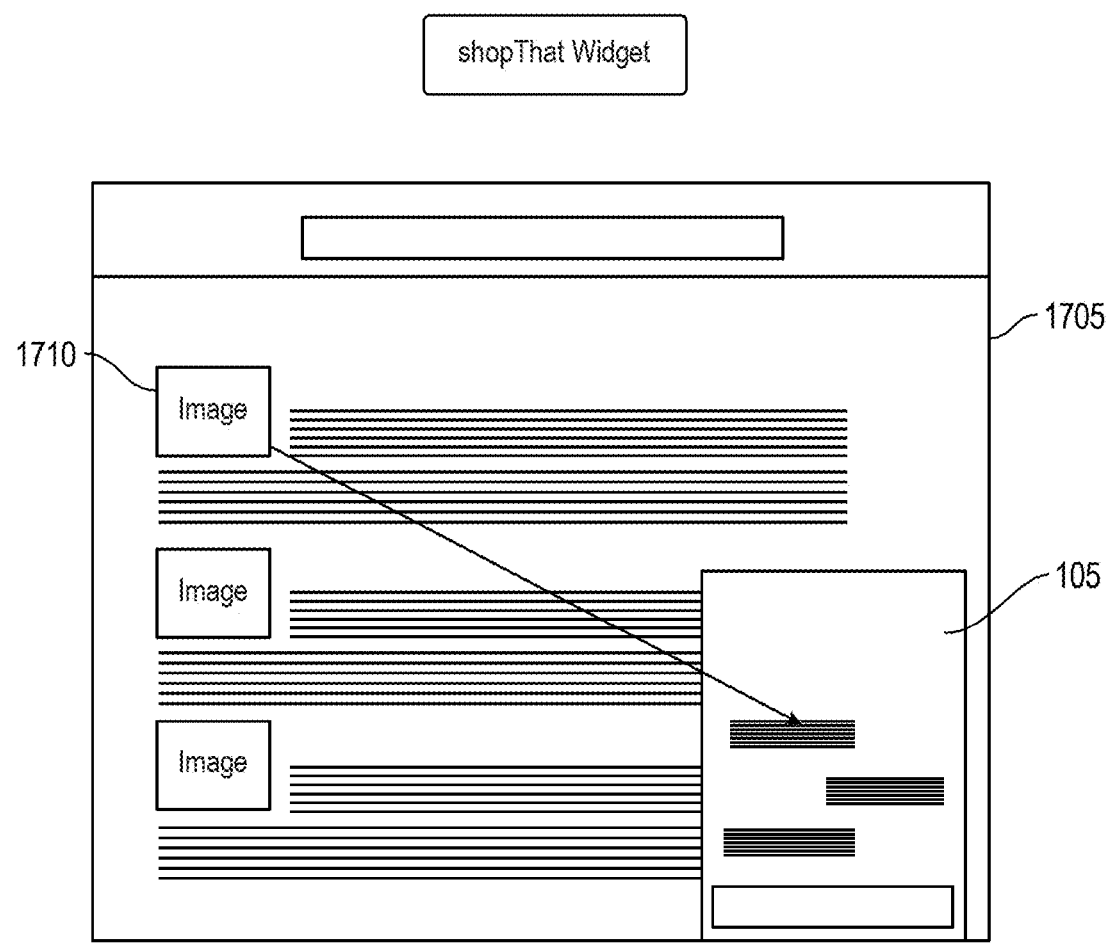
FIG. 17 illustrates an example of contextual searching on websites, using the shopThat widget associated with the chatbot, according to embodiments of the invention.
Figure 18:
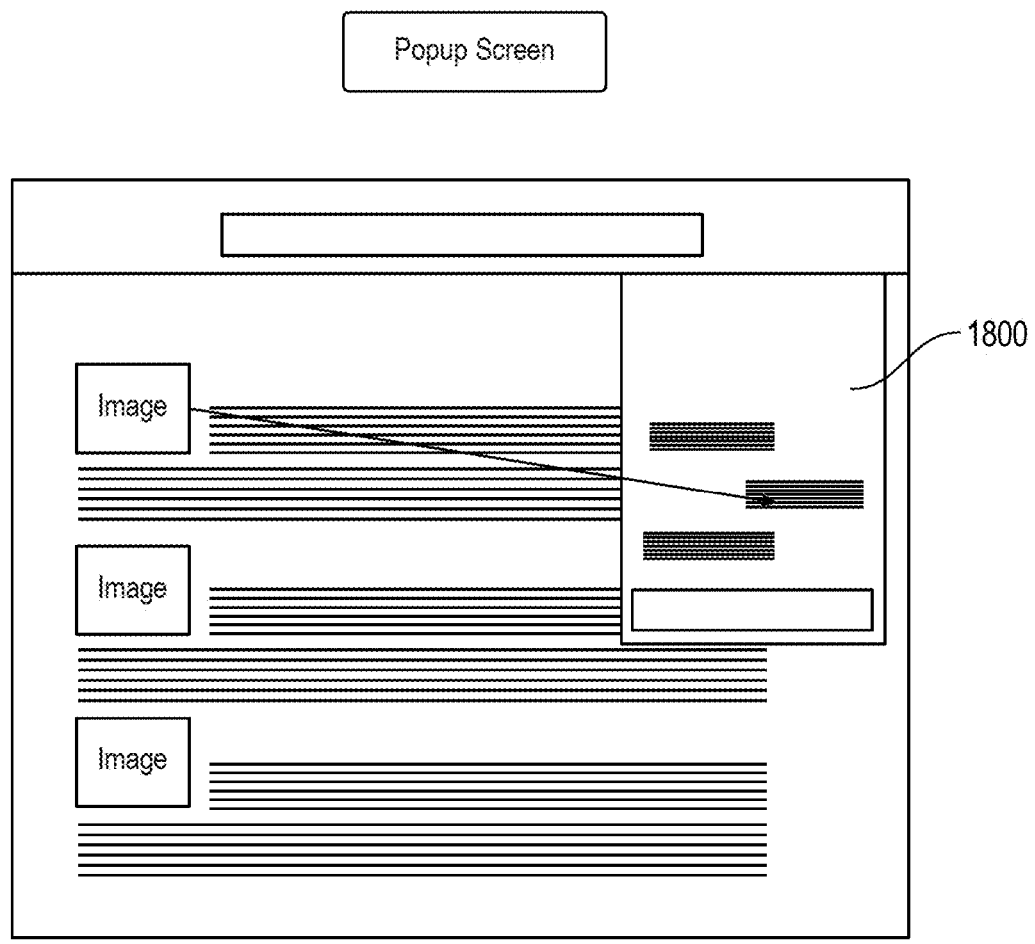
FIG. 18 illustrates a similar example of contextual searching on websites using a popup display according to embodiments of the invention.
Figure 19:
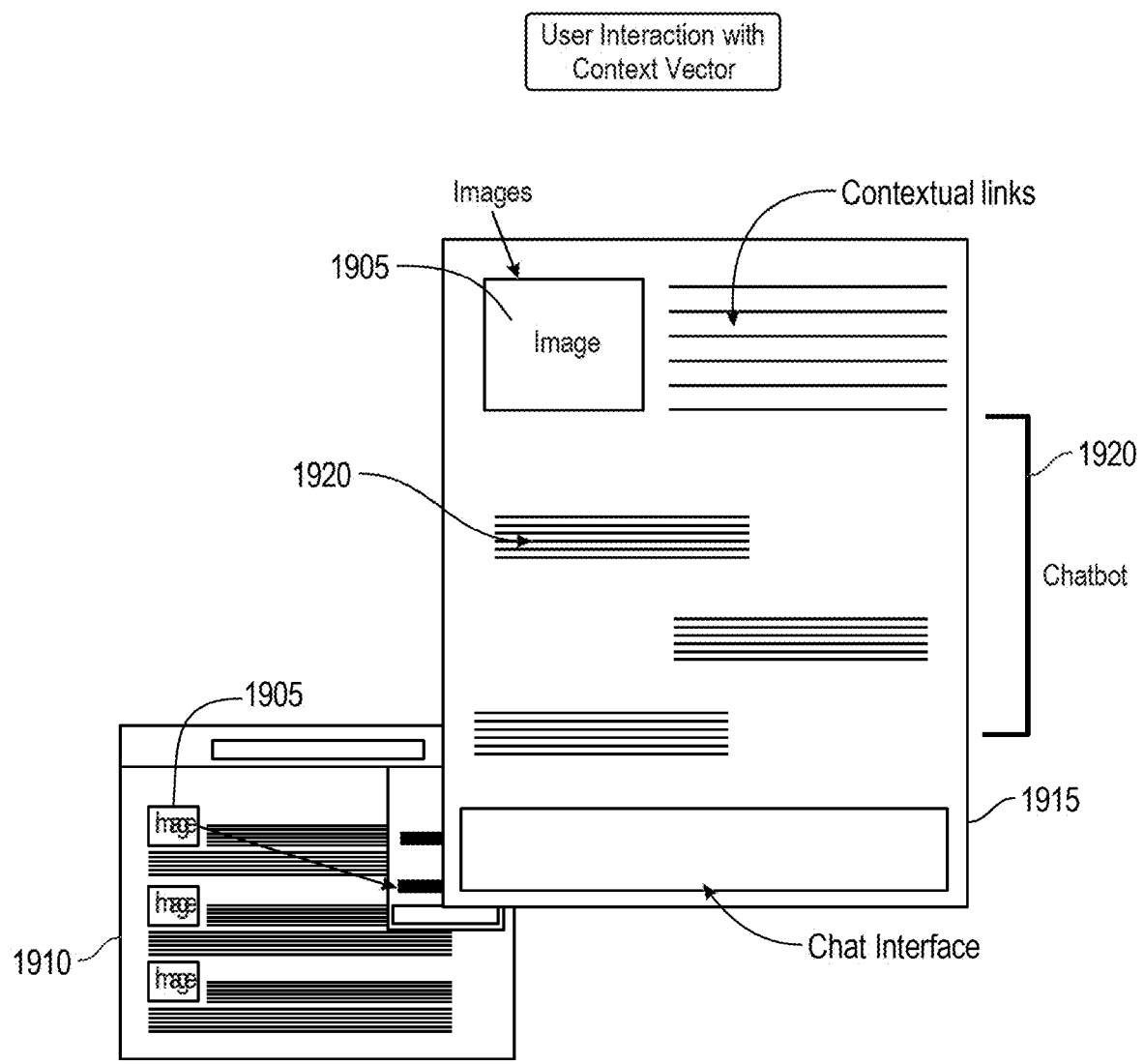
FIG. 19 illustrates another example of contextual searching on websites in which users can drag media from the webpage into the widget associated with the SoLChat chatbot and the contextual search engine automatically provides related information related to that particular media, according to embodiments of the invention.

FIG. 17 illustrates an example of contextual searching on a website 1705, using the widget 105 associated with the SoLChat chatbot, according to embodiments of the invention. This embodiment contemplates users having the ability to drag media, e.g., an image 1710, from the webpage 1705 into the widget 105, and the contextual search engine automatically provides information related to that particular media. This includes any image whose contextual information the search engine SoLSearch 110 can scan, not just an image embedded with SoLView 155. FIG. 18 illustrates a similar example 1800 of contextual searching on websites using a popup display 1800. FIG. 19 illustrates another example of contextual searching on websites in which users can drag media, e.g., an image 1905, from the webpage 1910 into the widget 1915 associated with the SoLChat chatbot and the contextual search engine automatically provides related information 1920 related to that particular media.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computing system, comprising:
a display space;
one or more processors; and
a memory to store computer-executable instructions, comprising a user interface application and a chatbot application that, when executed by the one or more processors, cause the one or more processors to perform operations comprising:

displaying, by the user interface application, a series of digital images in the display space;

receiving, via the user interface application, user input to select one of the series of digital images, or a portion thereof;

displaying the user-selected digital image, or the portion thereof, in a location within a field of view of the displayed series of digital images or the display space; and while the user interface application continues to display the user-selected digital image, or portion thereof,
searching in one or more digital data sources for, and retrieving, by the chatbot application, contextual information based on the displayed user-selected digital image, or portion thereof, without receiving user input to request searching in the one or more digital data sources for contextual information based on the displayed user-selected digital image, or portion thereof;

detecting, by the chatbot application, one or more user interactions with one or more of the user interface application, the displayed series of digital images, the display space, the location within the field of view of the displayed series of digital images or the display space, or the user-selected digital image or the portion thereof;

displaying, by the chatbot application, a portion of the retrieved contextual information as related digital data content in the location within the field of view of the displayed series of digital images or the display space, based in part on the detected one or more user interactions with the one or more of the user interface application, the displayed series of digital images, or the display space, without receiving user input to perform the displaying the portion of the retrieved contextual information as related digital data content; and receiving, by the chatbot application, user input, responsive to the displayed portion of the retrieved contextual information as related digital data content.

2. The computing system of claim 1, further comprising:

receiving, via the user interface application, user input to transfer the displayed user-selected digital image, or the portion thereof, in the location within the field of view of the displayed series of digital images or the display space to an online shopping cart; and retrieving into the online shopping cart the related digital data content.

3. The computing system of claim 2, wherein receiving, via the user interface application, the user input to select one of the series of digital images, or the portion thereof, consists of receiving one or more of the following user inputs: a voice command, a gesture command, a photo, a video, or a screenshot.

4. The computing system of claim 1, wherein the related digital data content is a digital image in which one or more objects appear;

wherein displaying, by the chatbot application, the portion of the retrieved contextual information as related digital data content in the location within the field of view of the displayed series of digital images or the display space, comprises displaying, by the chatbot application, the digital image in the location within the field of view of the displayed series of digital images or the display space; and wherein the computer executable instructions cause the one or more processors to perform further operations, comprising receiving, by the chatbot application, user input, responsive to the displayed digital image, to search for information about the one or more objects that appear in the displayed digital image.

5. The computing system of claim 1, wherein the computer executable instructions cause the one or more processors to perform further operations, comprising adding the related digital data content to, or associating the related digital content with, a file, a repository, or a storage location in or at which the displayed series of digital images and/or the displayed user-selected digital image, or portion thereof, is maintained, based in part on the detected one or more user interactions with the one or more of the user interface application, the displayed series of digital images, the display space, the location within the field of view of the displayed series of digital images or the display space, or the user-selected digital image, or the portion thereof, without receiving user input to perform the adding or associating.

6. The computing system of claim 5, wherein the related digital data content is a digital image in which one or more objects appear; and wherein adding the related digital data content to, or associating the related digital content with, the file in which the displayed series of digital images is maintained, comprises adding the digital image to, or associating the digital image with, the file in which the displayed series of digital images is maintained.

7. The computing system of claim 6, wherein the computer executable instructions cause the one or more processors to perform further operations, comprising adding, by a Non-Fungible Token (NFT) engine, an NFT layer to the digital image, thereby creating an NFT file comprising the digital image.

8. The computing system of claim 5, wherein adding the related digital data content to, or associating the related digital content with, a file, a repository, or a location in or at which the displayed series of digital images is maintained, comprises adding the related digital data content to, or associating the related digital content with, a location in an distributed digital ledger at which the displayed series of digital data images is maintained, or to a location chained to the location in the distributed digital ledger at which the displayed series of digital images is maintained.

9. The computing system of claim 8, wherein the related digital data content is a digital image in which one or more objects appear;

wherein adding the related digital data content to, or associating the related digital content with, the location in the distributed digital ledger at which the displayed series of digital images is maintained, or to the location chained to the location in the distributed digital ledger at which the displayed series of digital images is maintained, comprises adding the digital image to, or associating the digital image with, the location in the distributed digital ledger at which the displayed series of digital images is maintained, or to the location chained to the location in the distributed digital ledger at which the displayed series of digital data images is maintained; and wherein the computer executable instructions cause the one or more processors to perform further operations, comprising:

receiving, by the chatbot application, user input, responsive to the displayed digital image, to search for information about the one or more objects that appear in the displayed digital image; and searching the location in the distributed digital ledger at which the displayed series of digital images is maintained, or to the location chained to the location in the distributed digital ledger at which the displayed series of digital images is maintained, for information about the one or more objects added to or associated with the displayed series of digital images.

10. The computing system of claim 8,
wherein the related digital data content is a digital image in which one or more objects appear;
wherein adding the related digital data content to, or associating the related digital content with, the location in the distributed digital ledger at which the displayed series of digital data images is maintained, or to the location chained to the location in the distributed digital ledger at which the displayed series of digital images is maintained, comprises adding the digital image to, or associating the digital image with, the location in the distributed digital ledger at which the displayed series of digital images is maintained, or to the location chained to the location in the distributed digital ledger at which the displayed series of digital images is maintained; and
wherein the computer executable instructions cause the one or more processors to perform further operations, comprising:
accessing, by a machine learning application, information about the one or more objects that appear in the displayed digital image added to or associated with at the location in the distributed digital ledger at which the displayed series of digital images is maintained, or to the location chained to the location in the distributed digital ledger at which the displayed series of digital images is maintained; and
training, by the machine learning application, on the information about the one or more objects.

11. A computer-implemented method, comprising:
displaying a series of digital images in a display space;
receiving user input to select one of the series of digital images, or a portion thereof;
displaying the user-selected digital image, or the portion thereof, in a location within a field of view of the displayed series of digital images or the display space; and
while continuing to display the user-selected digital image, or the portion thereof, searching in one or more digital data sources for, and retrieving therefrom, contextual information based on the displayed user-selected digital image, or portion thereof, without receiving user input to request searching in the one or more digital data sources for contextual information based on the displayed user-selected digital image, or portion thereof;
detecting, by the chatbot application, one or more user interactions with one or more of the user interface application, the displayed series of digital images, the display space, the location within the field of view of the displayed series of digital images or the display space, or the user-selected digital image or the portion thereof;
displaying, by the chatbot application, a portion of the retrieved contextual information as related digital data content in the location within the field of view of the displayed series of digital images or the display space, based in part on the detected one or more user interactions with the one or more of the user interface application, the displayed series of digital images, or the display space, without receiving user input to perform the displaying the portion of the retrieved contextual information as related digital data content; and
receiving, by the chatbot application, user input, responsive to the displayed portion of the retrieved contextual information as related digital data content.

12. The computer-implemented method of claim 11, further comprising:
receiving user input to transfer the displayed user-selected digital image, or the portion thereof, in the location within the field of view of the displayed series of digital images or the display space to an online shopping cart; and
retrieving into the online shopping cart the related digital data content.

13. The computer-implemented method of claim 12, wherein receiving the user input to select one of the series of digital images, or the portion thereof, consists of receiving one or more of the following user inputs: a voice command, a gesture command, a photo, a video, or a screenshot.

14. The computer-implemented method of claim 11,
wherein the related digital data content is a digital image in which one or more objects appear;
wherein displaying the portion of the retrieved contextual information as related digital data content in the location within the field of view of the displayed series of digital images or the display space, comprises displaying the digital image in the location within the field of view of the displayed series of digital images or the display space; and
further comprising receiving, user input, responsive to the displayed digital image, to search for information about the one or more objects that appear in the displayed digital image.

15. The computer-implemented method of claim 11, further comprising adding the related digital data content to, or associating the related digital content with, a file, a repository, or a storage location in or at which the displayed series of digital images and/or the displayed user-selected digital image, or portion thereof, is maintained, based in part on the detected one or more user interactions with the one or more of the user interface application, the displayed series of digital images, the display space, the location within the field of view of the displayed series of digital images or the display space, or the user-selected digital image, or the portion thereof, without receiving user input to perform the displaying.

16. The computer-implemented method of claim 15, wherein the related digital data content is a digital image in which one or more objects appear; and
wherein adding the related digital data content to, or associating the related digital content with, the file in which the displayed series of digital images is maintained, comprises adding the digital image to, or associating the digital image with, the file in which the displayed series of digital images is maintained.

* * * * *